US007326361B2

(12) United States Patent
Walters et al.

(10) Patent No.: US 7,326,361 B2
(45) Date of Patent: Feb. 5, 2008

(54) MOLECULAR MELT AND METHODS FOR MAKING AND USING THE MOLECULAR MELT

(75) Inventors: Marlin E. Walters, West Columbia, TX (US); Marius W. Sorenson, Lake Jackson, TX (US); Malcolm F. Finlayson, Houston, TX (US); Robin J. Lee, Lake Jackson, TX (US); Clark H. Cummins, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 11/604,533

(22) Filed: Nov. 27, 2006

(65) Prior Publication Data

US 2007/0125980 A1 Jun. 7, 2007

Related U.S. Application Data

(62) Division of application No. 10/811,535, filed on Mar. 29, 2004, now Pat. No. 7,141,182, which is a division of application No. 09/848,933, filed on May 4, 2001, now Pat. No. 6,776,924.

(60) Provisional application No. 60/202,171, filed on May 4, 2000.

(51) Int. Cl.
*C09K 3/00* (2006.01)

(52) U.S. Cl. .......................... 252/182.13; 252/188.28; 502/500

(58) Field of Classification Search ........... 252/182.13, 252/188.28; 502/500
See application file for complete search history.

(56) References Cited

U.S. PATENT DOCUMENTS

| 3,058,944 A | 10/1962 | Breslow et al. |
| 3,203,936 A | 8/1965 | Breslow et al. |
| 3,203,937 A | 8/1965 | Breslow et al. |
| 3,282,864 A | 11/1966 | Bost et al. |
| 3,298,975 A | 1/1967 | Feild et al. |
| 3,336,268 A | 8/1967 | Cox |
| 3,341,480 A | 9/1967 | Feild |
| 3,377,415 A | 4/1968 | Oppenlander |
| 3,389,198 A | 6/1968 | Taber |
| 3,530,108 A | 9/1970 | Oppenlander |
| 3,645,992 A | 2/1972 | Elston |
| 3,687,920 A | 8/1972 | Johnson |
| 3,893,989 A | 7/1975 | Leicht et al. |
| 3,914,342 A | 10/1975 | Mitchell |
| 3,959,425 A | 5/1976 | Herrington |
| 4,003,712 A | 1/1977 | Miller |
| 4,031,068 A | 6/1977 | Cantor |
| 4,076,698 A | 2/1978 | Anderson et al. |
| 4,113,802 A | 9/1978 | Matteoli et al. |
| 4,200,556 A | 4/1980 | Robinson et al. |
| 4,352,892 A | 10/1982 | Lohmar |
| 4,532,189 A | 7/1985 | Mueller |
| 4,579,905 A | 4/1986 | Krabbenhoft |
| 4,584,347 A | 4/1986 | Harpell et al. |
| 4,694,025 A | 9/1987 | Park |
| 4,714,716 A | 12/1987 | Park |
| 4,820,471 A | 4/1989 | van der Molen |
| 4,916,198 A | 4/1990 | Scheve et al. |
| 5,008,204 A | 4/1991 | Stehling |
| 5,037,895 A | 8/1991 | Maker et al. |
| 5,116,881 A | 5/1992 | Park et al. |
| 5,180,751 A | 1/1993 | Park et al. |
| 5,266,643 A | 11/1993 | Mustonen et al. |
| 5,272,236 A | 12/1993 | Lai et al. |
| 5,278,272 A | 1/1994 | Lai et al. |
| 5,284,613 A | 2/1994 | Ali et al. |
| 5,348,795 A | 9/1994 | Park |
| 5,358,792 A | 10/1994 | Mehta et al. |
| 5,373,236 A | 12/1994 | Tsui et al. |
| 5,414,027 A | 5/1995 | DeNicola, Jr. et al. |
| 5,491,019 A | 2/1996 | Kuo |
| 5,519,785 A | 5/1996 | Hara |
| 5,527,573 A | 6/1996 | Park et al. |
| 5,567,742 A | 10/1996 | Park |
| 5,605,936 A | 2/1997 | DeNicola et al. |
| 5,616,627 A | 4/1997 | Sakurai et al. |
| 5,641,848 A | 6/1997 | Giacobbe et al. |
| 5,747,594 A | 5/1998 | deGroot et al. |
| 5,767,033 A | 6/1998 | Imuta et al. |
| 5,844,045 A | 12/1998 | Kolthammer et al. |

(Continued)

FOREIGN PATENT DOCUMENTS

CA 797 917 10/1968

(Continued)

OTHER PUBLICATIONS

R. A. Abramovitch, Polar Radicals in Aromatic Substitution, *Intra-Science Chemistry Reports*, pp. 211-218, 1969.
R. A. Abramovitch et al., "Reaction of Sulphonyl Azides with Unstrained Olefins", *J. Chem. Soc.*, pp. 2169-2172, 1974.
R. A. Abramovitch et al., Intramolecular Insertion of Arylsulfonylnitrenes into Aliphatic Side Chains, *J. Org. Chem.*, vol. 42, No. 17, pp. 2920-2926, 1977.
R. A. Ambramovitch et al., Pyrolysis of Phenylaikylsulphonyl Azides and 2-phenethyl Azidofomate. Selectivity of Sulphonylnitrenes And Contrast between Sulphonyl-and Carbonyl-nitrenes, *J. Chem. Soc. Chem Commun.*, pp. 1087-1088, 1981.

(Continued)

*Primary Examiner*—Bernard Lipman

(57) ABSTRACT

The present invention includes a molecular melt composition comprising an antioxidant and a coupling agent. The molecular melt is partially amorphous in nature. The invention also includes a method for making the molecular melt composition and a method for using the molecular melt to produce coupled polymers. The invention further includes a method for using an antioxidant to phlagmatize a coupling agent.

22 Claims, 21 Drawing Sheets

U.S. PATENT DOCUMENTS

| | | | |
|---|---|---|---|
| 5,869,575 | A | 2/1999 | Kolthammer et al. |
| 5,883,151 | A | 3/1999 | Raetzsch et al. |
| 5,929,129 | A | 7/1999 | Feichtinger |
| 6,054,540 | A | 4/2000 | Chaudhary et al. |
| 6,103,833 | A | 8/2000 | Hogt et al. |
| 6,143,829 | A | 11/2000 | Babb et al. |
| 6,143,854 | A | 11/2000 | Bamberger et al. |
| 6,207,754 | B1 | 3/2001 | Yu |
| 6,211,302 | B1 | 4/2001 | Ho et al. |
| 6,417,242 | B1 | 7/2002 | Hughes et al. |

FOREIGN PATENT DOCUMENTS

| | | |
|---|---|---|
| CA | 1 024 296 | 1/1978 |
| CA | 1 219 389 | 3/1987 |
| DE | 1 569 025 | 7/1970 |
| EP | 0 351 208 | 1/1990 |
| EP | 0 474 376 | 3/1992 |
| EP | 0 595 252 | 5/1994 |
| EP | 0 625 545 | 11/1994 |
| EP | 0 634 441 | 1/1995 |
| EP | 0 634 454 | 1/1995 |
| EP | 0 702 032 | 3/1996 |
| EP | 0 747 376 | 5/1996 |
| EP | 0 634 454 | 11/1997 |
| EP | 0 625 545 | 1/1998 |
| EP | 0 634 441 | 5/1998 |
| EP | 0 872 517 | 10/1998 |
| GB | 1 080 619 | 8/1967 |
| GB | 2 205 103 A | 11/1988 |
| JP | 46-31756 | 9/1971 |
| JP | 50-133248 | 10/1975 |
| WO | 93/04486 | 3/1993 |
| WO | 96/07681 | 3/1996 |
| WO | 96/20247 | 7/1996 |
| WO | 97/20888 | 6/1997 |
| WO | 97/20889 | 6/1997 |
| WO | 99/10415 | 3/1999 |
| WO | 99/10424 | 3/1999 |
| WO | 99/10426 | 3/1999 |
| WO | 00/02960 | 1/2000 |
| WO | 00/02961 | 1/2000 |
| WO | 00/52091 | 9/2000 |
| WO | 00/53669 | 9/2000 |
| WO | 00/78858 | 12/2000 |
| WO | 00/78861 | 12/2000 |

OTHER PUBLICATIONS

R. A. Ambramovitch et al., "Reaction of Aromatic Sulfonyl Azides with Dienes", *J. Org. Chem.*, vol. 46, pp. 330-335, 1981.

H. Radusch et al., "Chemical coupling of polystyrene and polybutadiene in melt mixtures by using an organic sulfonylazide", *Die Angewandte Makromolekulare Chemie*, vol. 204, pp. 177-189, 1993.

N. Takashima et al., "The Processings of Crosslinked Plastics", *Kogaku Kogyo* (*Chemical Industry*), pp. 378-383, 1969.

D. S. Breslow et al., "Thermal Reactions of Sulfonyl Azides", *J. Amer. Chem. Soc.*, vol. 91, pp. 2273-2279, 1969.

Derwent Chemical Abstract No. 1977-02552Y of JP 51134762 A.

M. Xanthos, "Interfacial Agents of Multiphase Polymer systems: Recent Advances", *Polymer Engineering and Science*, vol. 28, pp. 1392-1400, 1988.

K. A. Chaffin et al., "Semicrystalline Blends of Polyethylene and Isotactic Polypropylene: Improving Mechanical Performance by Enhancing the Interfacial Structure", *Journal of Polymer Science: Part B: Polymer Physics*, vol. 38, pp. 108-121, 2000.

E. P. Moore, *Polypropylene Handbook*, pp. 15-45, 1996.

E. P. Moore, *Polypropylene Handbook*, pp. 220, 1996.

E. P. Moore, *Polypropylene Handbook*, pp. 330-332, 1996.

U.S. Appl. No. 09/133,576, filed Aug. 13, 1998, Craig Silvis et al., "In-Situ Rhelogy Modification of Polyolefins".

U.S. Appl. No. 10/281,409, filed Oct. 25, 2002, Patricia Ansems et al., "Polyolefin Composition with Improved Impact Properties".

Hen and Shetty, "Studies on Multilayer Film Coextrusion III. The Rheology of Blown Film Coextrusion", *Polymer Engineering and Science*, vol. 18, No. 3, pp. 187-199, 1978.

Inoue, "Selective Crosslinking in Polymer Blends. I. Novel Selective Crosslink Systems for Polypropylene/Unsaturated Elastomer Blends", *Journal of Applied Polymer Science*, vol. 54, pp. 709-721, 1994.

Inoue, "Selective Crosslinking in Polymer Blends. II. Its Effect on Impact Strength and Other Mechanical Properties of Polypropylene/Unsaturated Elastomer Blends", *Journal of Applied Polymer Science*, vol. 54, pp. 723-733, 1994.

Inoue and Suzuki, "Selective Crosslinking Reaction in Polymer Blends. III. The Effects of the Crosslinking of Dispersed EPDM Particles on the Impact Behavior of PP/EPDM Blends", *Journal of Applied Polymer Science*, vol. 56, pp. 1113-1125, 1995.

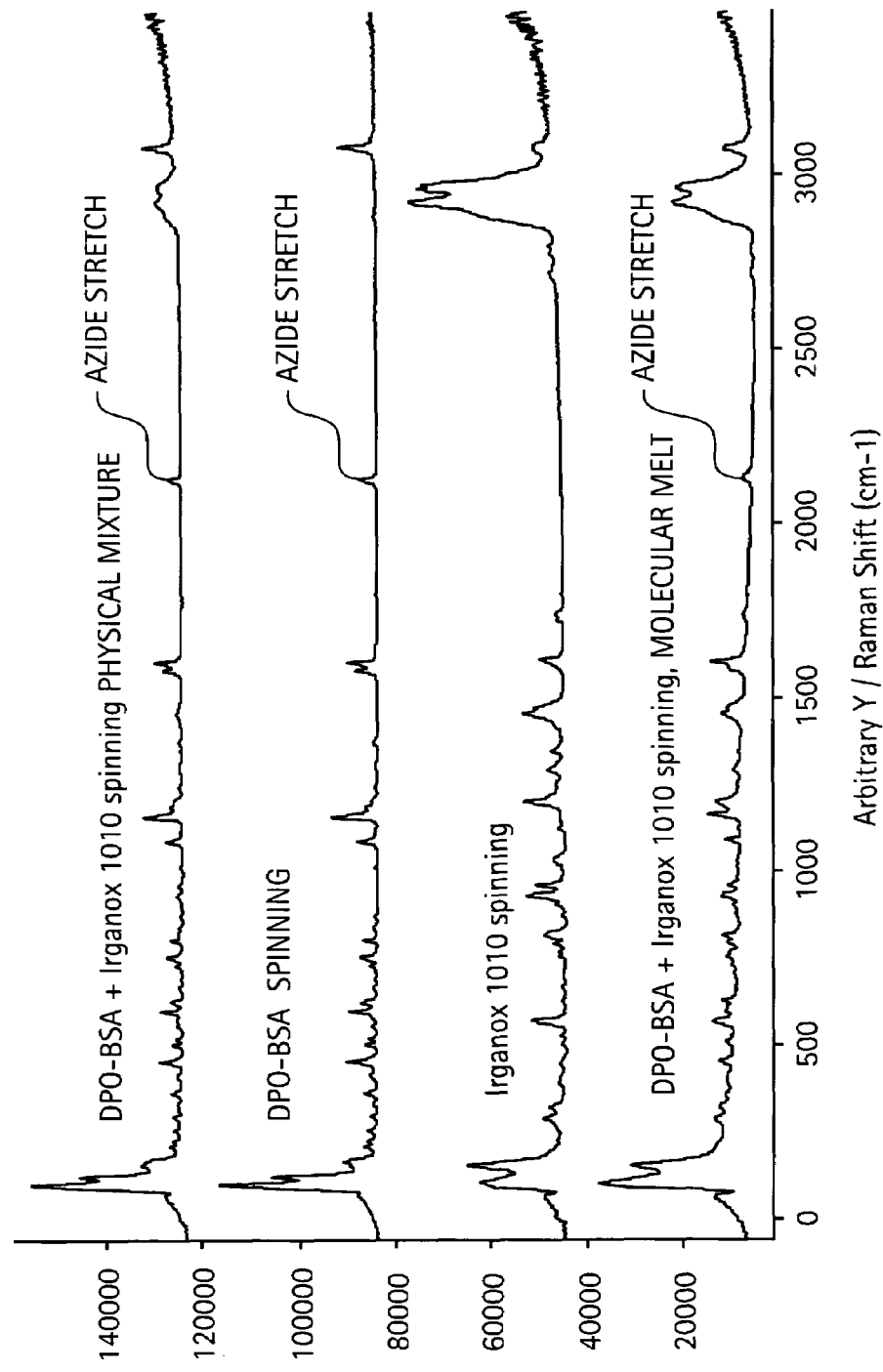

○ Detonation
● Deflagration
△ No explosion propagation
— Yoshida's Line
□ Experimental value for Sample B

MOLECULAR MELT AND METHODS FOR MAKING AND USING THE MOLECULAR MELT

Cross-Reference to Related Application

This application is a divisional of application Ser. No. 10/811,535 filed Mar. 29, 2004, now U.S. Pat. No. 7,141,183, which is a divisional of application Ser. No. 09/848,933, filed May 4, 2001, now U.S. Pat. No. 6,776,924.

This application claims the benefit of U.S. Provisional Application No. 60/202,171, filed May 4, 2000 which is incorporated by reference herein in its entirety.

BACKGROUND

Polyolefins and other polymers are frequently modified in order to improve their rheological and other physical properties. Various chemical agents have been used to carry out such modifications.

One method for modifying polymers, such as polyolefins, is to use molecules that are capable of providing a nitrene reactive group(s) for insertion into C—H bonds on the polymers. An example of such a class of chemicals are the sulfonyl azides which are disclosed in WO 99/10424 published Mar. 4, 1999, which is hereby incorporated by reference for its teachings regarding azides. When heated to an appropriate reaction temperature, these azides decompose to form nitrene groups that can then insert into C—H bonds on the polymers. These sulfonyl azides are effective for providing nitrene groups for insertion into the C—H bonds of styrenic based and polyolefin based polymers.

However, sulfonyl azides and other azides can be shock sensitive. It may be necessary to phlagmatize the azides or to otherwise protect the azides from reaction during the manufacture and processing of the azide and the shipping and handling of the azide. However, the methods that would typically be used to protect chemicals such as azides from reacting can be expensive and may not be compatible with the polymers that are to be modified. Additionally, polymers are often used for packaging food. Therefore, it is important that the addition of the protective agent not prevent the modified polymer from being approved for food packaging applications.

What is desired is a relatively inexpensive and easy manner for phlagmatizing a coupling agent that also does not interfere with the coupling agent or limit the use of the coupling agent for producing modified polymers.

As used herein, the following terms shall have the following meanings:

(a) "Coupling Agent" shall mean a chemical compound that contains at least two reactive groups that are each capable of forming a carbene or nitrene group that are capable of inserting into the carbon hydrogen bonds of CH, CH2, or CH3 groups, both aliphatic and/or aromatic, of a polymer chain. The reactive groups together can couple or cross-link polymer chains. It may be necessary to activate a coupling agent with heat, sonic energy, radiation or other chemical activating energy, for the coupling agent to be effective for coupling and/or cross-linking polymers chains.

(b) "Phlagmatizing" refers to methods for reducing the shock sensitivity of a chemical or chemical species by mixing or combining the reactive chemical with an inert or less reactive chemical.

(c) "molecular melt" refers to an at least partially amorphous blend, at room temperature, of a coupling agent (modifying agent) and an antioxidant, optionally also containing other polymer additives. Both the coupling agent (modifying agent) and the antioxidant are at least partially contained in the amorphous phase of the blend. Also, preferably the coupling agent (modifying agent) and the antioxidant form a complex where the Raman spectra relating to the groups forming the nitrene groups are shifted compared to the Raman spectra exhibited by the groups forming the nitrene groups of the coupling agent alone.

(d) "antioxidant" refers to types or classes of chemical compounds that are capable of being used to minimize the oxidation that can occur during the processing of polymers. The term also includes chemical derivatives of the antioxidants, including hydrocarbyls. The term further includes chemical compounds, as described later in the description of the antioxidant, that when properly combined with the coupling agent (modifying agent) interact with to form a complex which exhibits a modified Raman spectra compared to the coupling agent or modifying agent alone.

(e) "modifying agent" refers to a chemical compound that contains a reactive group capable of forming a carbene or a nitrene group that can react with a polymer chain.

(f) "target polymer" refers to a polymer that is intended to be modified by the coupling or modifying agent. The target polymer can be any polymer that contains CH, CH2, or CH3 groups, aliphatic or aromatic, of a polymer chain. Preferably, the target polymer can be any polyolefin (including polyethylene) or styrenic based polymer.

(g) "DSC" refers to a differential scanning calorimeter or differential scanning calorimetry analysis, depending on the context it is used in. DSC is a method one of ordinary skill in the art is familiar with to determine the crystallinity of a polymer.

(h) "Nitrene group" refers to a compound having a structure R—N, where N is nitrogen capable of reacting with a polymer chain by inserting into the carbon hydrogen bonds of CH, CH2, or CH3 groups, both aliphatic and/or aromatic, of a polymer chain. It is believed that the nitrogen most preferred for inserting into the carbon hydrogen bonds has two lone pairs of electrons. R may be any atom or atoms that do not adversely interfere with the nitrogen inserting into the above-described carbon hydrogen bonds.

(i) "Carbene group" refers to a compound having a structure

where C is carbon capable of reacting with a polymer chain by inserting into the carbon hydrogen bonds of CH, CH2 or CH3 groups, both aliphatic and/or aromatic, of a polymer chain. It is believed that the carbon most preferred for inserting into the carbon hydrogen bonds has one lone pair of electrons. R and R' are independently any atom or atoms that do not adversely interfere with the carbon inserting into the above-described carbon hydrogen bonds.

(j) "DPO—BSA" refers to the following compound: 4,4'-Oxydibenzenesulfonyl azide.

SUMMARY

It has been surprisingly discovered that, an antioxidant and a coupling agent (or modifying agent) may be blended together to form a molecular melt, and that the formation of this molecular melt can phlagmatize the coupling and/or modifying agent.

In a first aspect of the invention, a molecular melt composition is disclosed comprising: (a) an antioxidant; and (b) a coupling agent.

In a second aspect of the invention, a molecular melt composition is disclosed comprising: (a) an antioxidant; and (b) a modifying agent.

In a third aspect of the invention, a method for phlagmatizing a coupling agent contained in a liquid is disclosed comprising the step of: introducing an antioxidant into the liquid. The coupling agent, which preferably is a poly(sulfonyl azide), may be dissolved or suspended in the liquid; and the antioxidant may be introduced before or after the coupling agent is produced.

In a fourth aspect of the invention, a method for phlagmatizing a modifying agent contained in a liquid is disclosed comprising the step of: introducing an antioxidant into the liquid. The modifying agent may be dissolved or suspended in the liquid. The antioxidant may be introduced before or after the coupling agent is produced.

In a fifth aspect of the invention, a method for making a molecular melt is disclosed comprising the steps of: introducing an antioxidant into a liquid containing a coupling agent and recovering the molecular melt. If it is desired to recover the molecular melt in a dry form, it can be recovered by precipitation from the liquid, or alternatively, the molecular melt may be recovered by co-crystallizing the antioxidant and the coupling agent.

In a sixth aspect of the invention, a method is disclosed for making a coupled polymer comprising the steps of mixing a molecular melt with a polymer; and reacting the molecular melt with the polymer. Preferably, the polymer is a polyolefin, more preferably a propylene based polymer and the coupling agent is preferably a poly(sulfonyl azide). The reaction typically will take place in a polymer extruder, which will both mix the molecular melt and the polymer and provide the energy necessary to cause the reaction between the molecular melt and the target polymer.

Additionally, it has been surprisingly discovered that, when the coupling agent (or modifying agent) is formed into a molecular melt, the efficiency of the coupling agent for modifying the polymer may be increased. Therefore, another aspect of the invention is the use of molecular melt to provide a more efficient method for making modified polymers and the compositions that result from such methods. Depending on the process used, the modifying agent used, the coupling agent used, and the concentrations of the coupling agents and/or modifying agents, this can provide rheology modified polymers, functionalized polymers, and/or cross-linked polymers (including, but not limited to thermosets).

It is believed that the molecular melt will greatly ease the manufacture of coupling and modifying agents to be used for polymers. It is also believed that the polymer modification processes that use such molecular melts will be far superior in efficiency and cost effectiveness than previously described processes.

BRIEF DESCRIPTION OF THE FIGURES

FIG. 1A is a depiction of the Raman Spectra obtained from DPO-BSA, Irganox 1010, a physical mixture of DPO-BSA and Irganox 1010, and a molecular melt containing DPO-BSA and Irganox 1010.

DETAILED DESCRIPTION

While this invention is susceptible of embodiment in many different forms, there are shown in the Figures, and will be described in detail herein, specific embodiments of the invention. It should be understood, however, that the present disclosure is to be considered as an exemplification of the principles of the invention and is not intended to limit the invention to the specific embodiment and examples illustrated.

The majority of the following discussion will be related to a molecular melt that is a blend of a coupling agent and an antioxidant. While the molecular melt comprised of a modifying agent and an antioxidant will not be discussed to detail, one of ordinary skill in art will realize that, unless stated otherwise, the discussions and information discussed below for the molecular melt comprised of a coupling agent and an antioxidant is also applicable for the molecular melt comprised of a modifying agent and an antioxidant.

Molecular Melt

The molecular melt is at least partially amorphous, it is believed that this amorphous nature will improve the ability of the molecular melt to phlagmatize the coupling agent. It is also believed that this amorphous nature will improve the efficiency of the molecular melt in modifying a target polymer. In many instances, it is preferable that the solubility of the molecular melt in the target polymer is higher than the solubility of the coupling agent in the target polymer.

Preferably, at least a portion of the coupling agent (modifying agent) and antioxidant present in the molecular melt form a complex, which does not adversely interfere with the utilization of the coupling agent for modifying polymers, and in which the Raman spectra relating to the nitrene forming group(s) are shifted compared to the Raman spectra exhibited by the nitrene forming groups of the coupling agent alone.

Figure 1B:
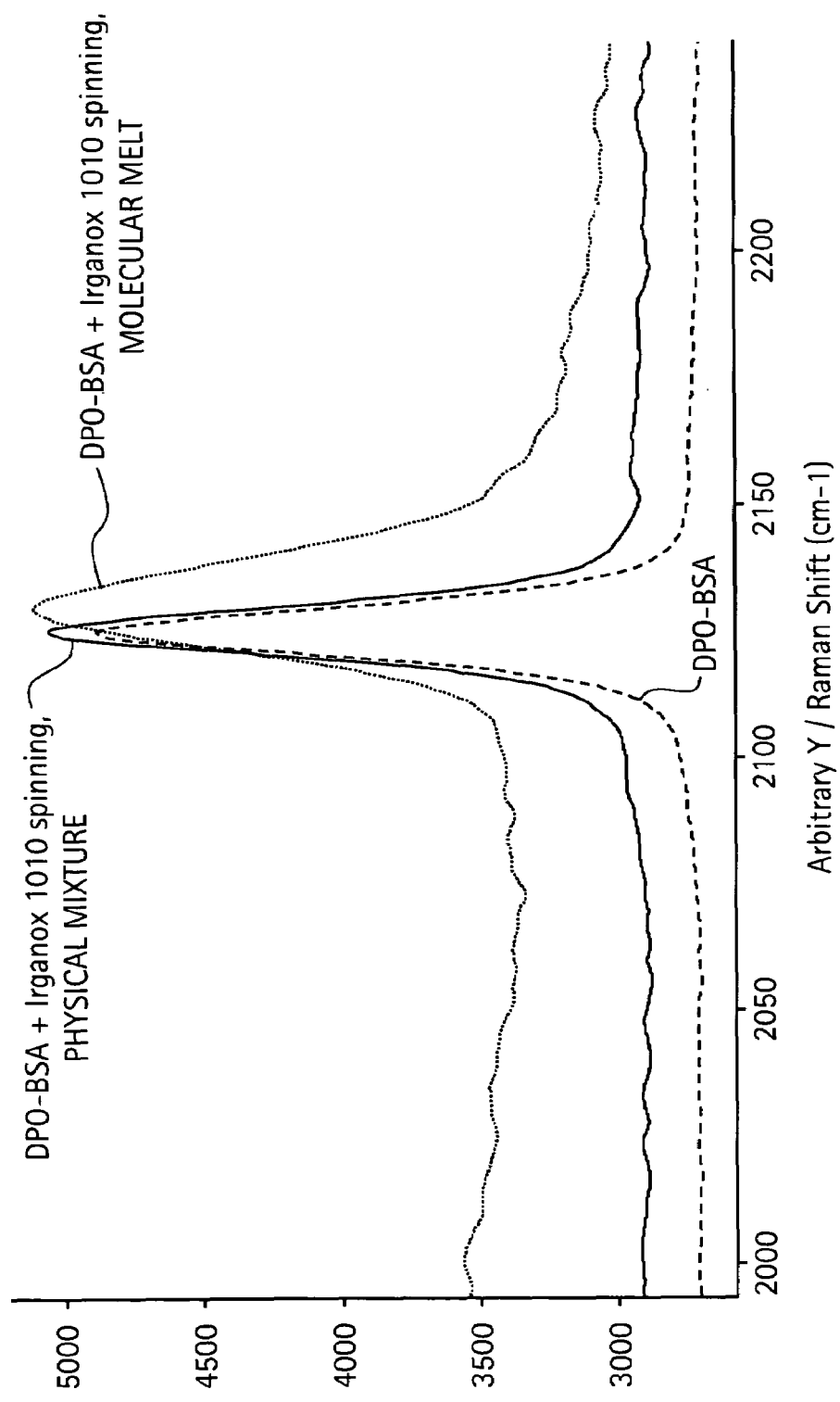
FIG. 1B is a depiction of those portions of the Raman Spectra for the DPO-BSA, the molecular melt containing DPO-BSA and Irganox 1010, and the physical mixture of DPO-BSA and Irganox 1010 that relate to the azide stretch for the DPO-BSA.

FIG. 1A shows the Raman spectra for DPO-BSA alone, IRGANOX-1010 alone, DPO-BSA combined with IRGANOX-1010 in a physical mixture having a 1:1 molar ratio of DPO-BSA to IRGANOX-1010; and a molecular melt comprised of a 1:1 molar ratio of DPO-BSA to IRGANOX-1010. FIG. 1B shows in closer detail the regions of the Raman spectra (for the DPO-BSA alone, the DPO-BSA/IRGANOX-1010 physical admixture, and the DPO-BSA/IRGANOX-1010 molecular melt) that relate to the azide stretch for the DPO-BSA. As can be seen from the FIGS, the Raman spectra for the molecular melt relating to the azide stretch has been broadened and shifted as compared to the Raman spectra for the DPO-BSA alone and for the DPO-BSA/IRGANOX-1010 physical admixture. Also note that the portion of the Raman spectra near about 2700 to about 3200 cm$^{-1}$ for the DPO-BSA molecular melt is similar in shape and size to the same portion of the Raman spectra for the IRGANOX-1010.

The mole ratio of coupling agent to antioxidant in the molecular melt is typically from about 1:10 to about 10:1, preferably from about 1:2 to about 8:1, more preferably from 1:1 to 4:1. It has surprisingly been found that the overall crystallinity of the molecular melt is typically related to the mole ratio of coupling agent to antioxidant. In most instances it is preferable that the ratio of coupling agent to antioxidant in the molecular melt be adjusted to provide a molecular melt having a total crystallinity of about 99 weighted average weight percent or below (as determined by DSC and calculated as set forth in Example 2), more preferably less than about 95 weighted average weight percent, further more preferably less than about 60 weighted average weight percent, most preferably less than about 40 weighted average weight percent. And, in some instances, when there is particular concern regarding the shock sensitivity of the molecular melt, it is preferable to provide a molecular melt having a crystallinity of about 20 weighted average weight percent or below, more preferably about 10 weighted average weight percent or below, further more preferably about 5 weighted average weight percent of below, most preferably about 1 weighted average weight percent or below as determined by DSC. For a molecular melt comprised of 4,4'-Oxydibenzenesulfonylazide and tetrakis [Methylene (3,5-di-t-butyl-4-hydroxyhydrocinnamate)], the molar ratio of coupling agent to antioxidant is preferably between about 1:2 and about 4:1. In some instances, low melting polymer additives such as polyethylene glycol and/or polypropylene glycol may be included in the molecular melt. It is believed that these types of compounds may reduce the crystallinity of the molecular melt and/or reduce the shock sensitivity of the molecular melt.

The molecular melt may be formed by melt blending the coupling agent and antioxidant, by co-precipitating the coupling agent and antioxidant from a common solvent, or any other method that will provide an at least partially amorphous molecular melt.

Other compounds, in addition to the coupling agent and antioxidant, may optionally be present in the molecular melt. Preferably, the additional compounds will not adversely react with either the coupling agent or the antioxidant and will not cause the crystallinity of the molecular melt to rise significantly. However, in some instances, for example, where blocking of the molecular melt is a concern, it may be desirable to add additional compounds which will increase the resulting crystallinity of the molecular melt. As discussed earlier, low melting materials such as polyethylene glycol and polypropylene glycol may optionally be included in the molecular melt to lower the shock-sensitivity and/or crystallinity of the molecular melt. It is preferable that the molecular melt not contain any phosphite based compounds (such as phosphite based antioxidants) as it is believed that these phosphite based compounds will adversely react with the coupling agent in the molecular melt. In general the additional compounds added to the molecular melt should be polymer additives that are typically added during the polymerization process or polymer processing process.

Examples of the additional compounds that may be present in the molecular melt include:

Internal lubricants, such as, polyethylene glycol (PEG), polypropylene glycol (PPG), calcium stearate, glycerol mono stearate (GMS);

Compatibilizing agents, such as, Titanium di(dioctylpyrophosphate)oxyacetate, Di(dioctylpyrophosphate) ethylene titanate, Isopropyl tricumylphenyl titanate, Tetra(2,2 diallyloxymethyl)butyl, di(ditridecyl)phosphio zirconate, Glycidoxypropyl-trimethoxysilane;

Release agents, such as, Oleamide, Stearamide, Zinc stearate, Erucamide, Aminopropyltrimethoxysilane, Bis(Glycidoxypropyl)tetramethyldisiloxane, Bis (3-(triethoxysilyl)propyl)-tetrasulfide, Bis(tri methylsilyl)urea;

Plasticizers, such as, Triisooctyl trimellitate, Epoxidized soybean oil, Di(2-ethylhexyl)adipate, Acetyl triethyl citrate, Acetyl tributyl citrate, Diisocecyl adipate, Triethyl citrate, Polybutene, Oleyl palitamide, N-stearyl erucamide, Distearyl thiodipropionate;

Ultra-Violet stabilizers, such as, 2-hydroxy-4-n-octoxybenzophenone; 2-hydroxy-4-methoxy-benzophenone; sodium dicyclohexyl sulfosuccinate;

Catalyst Neutralizers, such as, metal stearates (such as calcium stearate), hydro talcites, calcium lactate, and metal oxides; and combinations thereof.

Compounds containing phosphorous in the +3 oxidation state may be added to the molecular melt in limited quantities that do not adversely react with the coupling agent or modifying agent.

The molecular melt may be formed into any convenient form, solid or liquid. The molecular melt will typically be formed into particles that can be used in a process for modifying polymers, such as polyolefins. It is generally important to ensure that the coupling agents are properly dispersed in the target polymer prior to or during reaction. The applicants have discovered that in order to improve the dispersion of the coupling agent in the target polymer, the particle size can be modified according to the mole ratio of coupling agent to antioxidant in the molecular melt. The optimum particle size also depends on the equipment to be used to react the molecular melt with a target polymer. For example, for a molecular melt comprised of 4,4'-Oxydibenzenesulfonylazide (DPO-BSA) and tetrakis [Methylene (3,5-di-t-butyl-4-hydroxyhydrocinnamate)] at a molar ratio of 1:1 where a ZSK-40 co-rotating twin-screw extruder manufactured by Werner Pfleiderer Corporation is utilized, the average diameter of the particles of molecular melt is preferably about 3000 microns or less, more preferably about 2000 microns or less. For ease of processing and handling, the particles preferably have an average diameter of at least about 200 microns.

The particles may be formed using methods such as rotoforming, which provides uniformly sized and shaped particles from a flowable melt. Alternatively, methods such as prilling or spray drying or any other methods, such as milling, grinding, or tabletization may be used to generate the desired sized particles. When a highly amorphous molecular melt is desired, it is preferable to use a method that minimizes the resulting crystallinity of the molecular melt. Where blocking (or agglomeration) of the molecular melt is a concern, it is desirable to produce a molecular melt having a relatively high crystallinity. This high crystallinity will minimize or prevent the molecular melt particles from agglomerating. An example of a compound that may increase the crystallinity of the molecular melt is octacecyl-3-(3,5-di-tert.butyl-4-hydroxyphenyl)-propionate, a hindered phenol primary antioxidant available from the Ciba Specialty Chemicals Company under the trade name IRGANOX 1076 (I-1076). I-1076 can be optionally used as the second antioxidant with another more amorphous antioxidant as the first antioxidant in a molecular melt, as described in Example 14 below.

Coupling Agents and Modifying Agents:

As discussed earlier, the modifying agents and coupling agents of the invention are chemical compounds that contain at least one reactive group capable of forming a carbene or nitrene group. A modifying agent will have one such reactive group. A coupling agent will have two or more such reactive groups.

Examples of chemical compounds that contain at least one reactive group capable of forming carbene groups, include, for example, diazo alkanes, geminally-substituted methylene groups, ketenes, and metallocarbenes.

Examples of chemical compounds that contain at least one reactive group capable of forming a nitrene group, include, for example, silyl azides, phosphazene azides, sulfonyl azides, formyl azides, azides, salts of N-chlorosulfonamides, N,N-dichlorosulfonamides, and 2-trialkyl-1-sulfonylhydrazides (inner salt).

In general, the coupling agents and modifying agents have a structure $RX_n$ where each X independently designates a reactive group capable of forming a carbene or nitrene group and R represents a substituted, unsubstituted or inertly substituted hydrocarbyl, hydrocarbyl ether, hydrocarbyl polyether, sulfur, or silicon-containing group. Optionally, R has more than one oxygen, sulfur, or silicon in its backbone. Silicon containing groups include silanes and siloxanes, preferably siloxanes. The term inertly substituted refers to a substitution with atoms or groups that do not undesirably interfere with the desired reaction(s) or desired properties of the resulting modified polymer.

For a modifying agent, n=1. For a modifying agent, R is preferably functionalized with a heteroatom or group. The functional group is selected from groups that do not undesirably react with the reactive group that is capable of forming the carbene and/or nitrene group. In some instances it may be necessary to protect the functional group with a protecting group that minimizes the heteroatoms interaction with the reactive group (or the azide or carbene that is formed from the reactive group). This protecting group may be removed by a subsequent reaction. In some embodiments, it is preferable for R to be large enough to increase the solubility of the modifying agent in the target polymer. In these instances, R preferably has a total of at least about 10 carbon, oxygen, sulfur, and silicon atoms, more preferably at least about 20 carbon, oxygen, sulfur, and silicon atoms. Most preferably, the modifying agent has a long aliphatic or substituted aliphatic chain of at least about 30 atoms, more preferably at least about 40 atoms. It is believed that increasing the solubility of the modifying agent, will increase the dispersion of the modifying agent within the target polymer.

Examples of functional heteroatoms or groups that may be included in a modifying

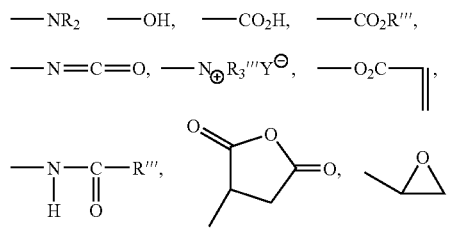

agent include, but are not limited, to the following:

Which are respectively an amino, a hydroxy, a carboxylic acid, an ester, an isocyanate, a quaternary ammonium salt, an acrylate, an amide, an anhydride, and an epoxy group. Where R''' represents any atom or group of atoms that do not adversely interfere with a reactive carbon of a carbene group (or a reactive nitrogen of a nitrene group) inserting into the carbon hydrogen bond of a target polymer; and N represents a nitrogen, O represents an oxygen, H represents a hydrogen, C represents a carbon, and Y represents a counter anion which may or may not be present after the group is incorporated into the modifying agent. Imides are another example of a group that may be incorporated into a modifying agent.

For a coupling agent, n is greater than one. For a coupling agent, R preferably represents an unsubstituted or inertly substituted hydrocarbyl, hydrocarbyl ether or silicon-containing group. While there is no critical limit to the length of R, each R preferably had sufficient carbon, sulfur, oxygen, or silicon atoms to separate the reactive groups sufficiently to permit a facile reaction between the target polymer(s) and the sulfonyl azide, more preferably at least 1, most preferably at least 2, further more preferably at least 3 carbon, oxygen, sulfur, or silicon atoms between the reactive groups. Preferably, carbon atoms separate the reactive groups. R preferably has a total of less than about 50 carbon, sulfur, oxygen, or silicon atoms in the backbone that separates reactive groups, more preferably less than about 20, most preferably less than about 15 total carbon, sulfur, oxygen, or silicon atoms. However, in some aspects it may be preferable to use a backbone that is longer and therefore increases the solubility of the coupling agent in the target polymer. In this aspect it is preferable that the backbone contain at least about 10 total carbon, sulfur, oxygen, or silicon atoms, more preferably at least about 20 total carbon, sulfur, oxygen, or silicon atoms, most preferably at least about 30 total carbon, sulfur, oxygen, or silicon atoms. In some embodiments, it is preferable that R contain a long aliphatic or substituted aliphatic chain as a side group, preferably, the chain contains at least about 10 total carbon, sulfur, oxygen, or silicon atoms, more preferably at least about 20 total carbon, sulfur, oxygen, or silicon atoms, most preferably at least about 30 total carbon, sulfur, oxygen, or silicon atoms. It is believed that this side group will increase the dispersion of the coupling agent in the target polymer.

In order to reduce the cost of manufacturing the coupling agent, it may be advantageous for the reactive groups (X's) for a given coupling agent to be the same. In other situations, it may be desirable for a coupling agent to contain two or more different types of reactive groups (X's). For example, if two target polymers having differing melt temperatures are to be coupled, it can be desirable to use a coupling agent that contains two different reactive groups which are activated at different temperatures.

In a preferred embodiment of the invention, the target polymer is a polyolefin and the coupling agent is a poly (sulfonyl azide). A poly(sulfonyl azide) is any compound having at least two reactive groups (the sulfonyl azide groups ($-SO_2N_3$)), which are reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide. Examples of atoms or groups that may be inertly substituted into R include, groups such as fluorine, aliphatic or aromatic ether, siloxane as well as sulfonyl azide groups when more than two polyolefin chains are to be joined. R is suitably aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonylazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although nitrosation and dehydration of sulfonyl hydazines with various reagents (nitrous acid, dinitrogen tetroxide, nitrosonium tetrafluoroborate) has been used.

The following discussion regarding the coupling reaction mechanism provides the inventors current theories, but is not intended to limit the scope of the invention. Sulfonyl azides decompose in several ways, but for the practice of the invention, the reactive species is believed to be the singlet nitrene as evidenced by insertion into C—H bonds is desired. Thermal decomposition is reported to give an intermediate singlet sulfonyl nitrene, which will react readily by insertion into carbon-hydrogen bonds. The temperatures necessary for efficient formation of the sulfonyl nitrene is usually greater than about 150° C. U.S. patent application Ser. No. 09/133,576 filed Aug. 13, 1998 contains additional teachings regarding sulfonyl azides and their use for modifying polyolefins. U.S. patent application Ser. No. 09/133,576 is incorporated by reference herein in its entirety.

Where the target polymer is to be heavily cross-linked, for example when it is desirable to form a thermoset or thermoplastic vulcanate (TPV), it can be preferable to utilize a coupling agent which contains more than two reactive groups capable of forming nitrene and/or carbene groups.

Antioxidants:

The antioxidants of the invention include chemicals that are useful as antioxidants for polymers and chemical derivatives of such antioxidants, including hydrocarbyls. Preferably, the antioxidant is not a phosphite-containing compound or a compound containing a phosphorous in the +3 oxidation state, as it is believed these compounds are highly reactive with the typical coupling agents utilized in the invention. An example of a phosphite-based antioxidant is Tris(2,4-di-tert-butylphenyl)phosphite available from Ciba Specialty Chemicals Company under the trade name Irgafos 168.

The antioxidants that can be utilized in the invention also include chemical compounds that can form a complex with the coupling agent or modifying agent which does not adversely interfere with the utilization of the coupling or modifying agent for modifying polymers and where the Raman spectra relating to the groups forming the nitrene group(s) of the complex are shifted compared to the Raman spectra exhibited by the groups forming the nitrene group(s) of the coupling agent or modifying agent alone.

It is preferred, but not necessary, that the chemical compounds utilized for the antioxidant of the invention, be capable of acting as antioxidants when the molecular melt is added to the target polymer.

The antioxidants utilized preferably have the capability of existing in an amorphous state. The antioxidant is preferably more soluble in the target polymer than the coupling agent at the typically processing conditions present during the modification of the target polymer. Also, the coupling agent should be chemically and sterically compatible with the antioxidant, so as to form a partially amorphous molecular melt wherein the reactive groups of the coupling agent do not appreciably adversely react with the antioxidant.

During the manufacture of the molecular melt, it is important to minimize the chance that dry crystalline coupling agent is present in a purified form, if the coupling agent is shock sensitive.

Figure 10:
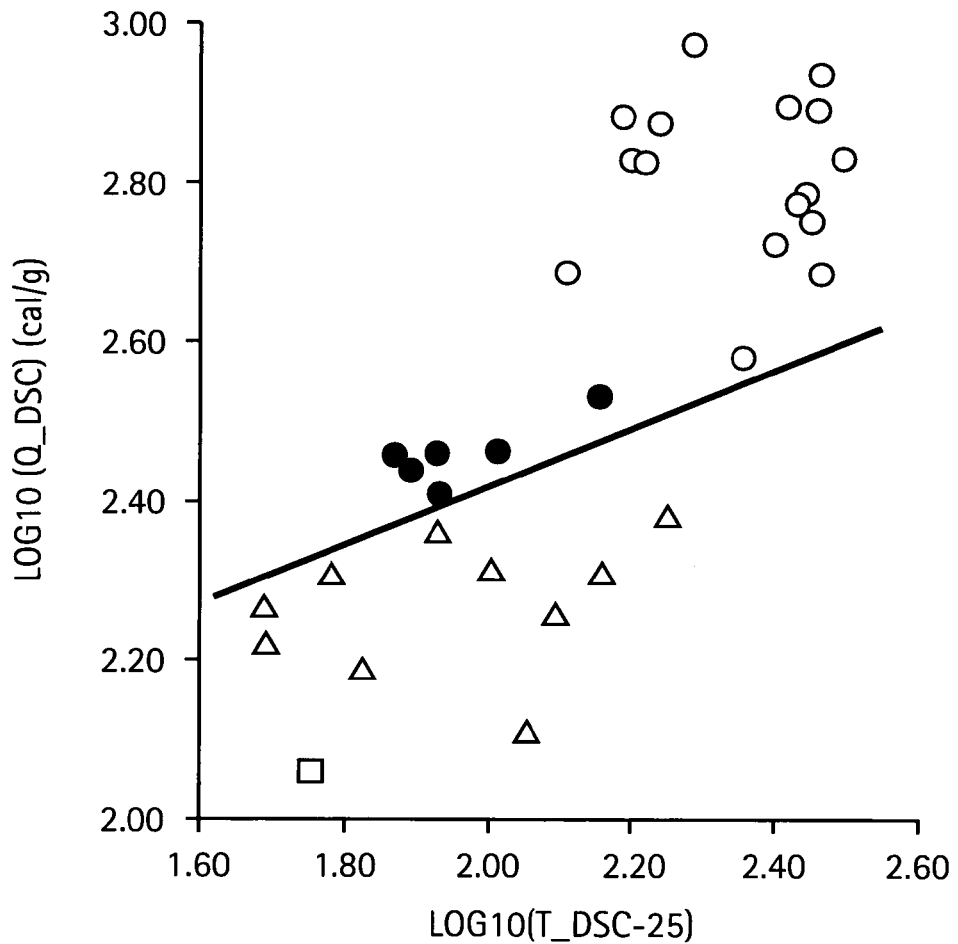
FIG. 10 is a plot of the Yoshida Correlation with the experimental value for the peak decomposition energy released from molecular melt sample B plotted.

Phlagmatization can be achieved by dilution of the coupling agent with non-shock sensitive materials. Phlagmatization is achieved when the total energy released (per weight of molecular melt) by the molecular melt in a DSC is low enough for the molecular melt to not be shock sensitive as taught by Yoshida in Kogyo Kayaku, Vol. 48 (No. 5), 1987, pp 311-316. Preferably, the total energy released in a DSC falls below the shock sensitivity line as shown in the Yoshida Correlation described in the same reference. FIG. 10 shows a plot of the Yoshida Correlation with the experimental value for the peak decomposition energy released from molecular melt sample B plotted. It can be seen from FIG. 10 that the plotted data from sample b is well below the shock sensitivity line.

The amorphous nature of the molecular melt minimizes and/or prevents the segregation of the coupling agent and antioxidant during the shipping and handling of the molecular melt.

Examples of classes of antioxidants that can be utilized in the invention include compounds which can function as either carbon radical and/or oxygen radical scavengers, such as, phenolic compounds and derivatives thereof, hindered amines, amine hydroxides, thioester compounds, and hindered phenolic compounds. Additionally, lactones, which it is believed can function as both carbon radical scavengers and oxygen radical scavengers are also included within the antioxidants which can be utilized in the invention. In some instances it may be preferable for the molecular melt to contain a mixture of antioxidants. An example of a lactone suitable for use in the invention is 5,7-bis(1,1-dimethyl-ethyl)-3-hydroxy-2(3H)-benzofuranone reaction products with o-xylene (Chemical Abstracts #181314-48-7), which is sold by the Ciba Specialty Chemicals Company, under the trade name IRGANOX HP-136.

The phenolic-based antioxidants and derivatives thereof and the lactones are preferred. Examples of phenolic-based antioxidants and substituted phenolic-based antioxidants include 2,2'-methylene bis(6-(1-methylcyclohexyl)-p-cresol and 2,6-ditertiary butyl-4-methyl phenol. It is believed that these classes of antioxidants are capable of forming highly amorphous (less than 10% crystallinity) molecular melts and are also capable of forming molecular melts having a high molar ratio of coupling agent to antioxidant (greater than 1:1). More preferably, the hindered phenolic compounds are utilized to form the molecular melt. An example of a hindered phenolic compound suitable for use in the invention is tetrakis [Methylene (3,5-di-t-butyl-4-hydroxyhydrocinnamate)] which is available from the Ciba Specialty Chemicals Company under the trade name Irganox 1010 (sometimes referred to as "I-1010").

Protection of Azide From Reaction:

The antioxidant in the molecular melt will at least partially protect the coupling agent from reacting with itself and other chemical compounds, such as compounds containing phosphorous in the +3 oxidation state that may adversely react with the coupling agent. By protecting the coupling agent, the antioxidant will increase the percentage of coupling agent that is available for reaction with the target polymer. This will increase the coupling efficiency of the coupling agent (i.e. less coupling agent wasted by side reactions Table 1 provides the decomposition peak energy (in Joules per gram of sample (J/g) released from several samples that were obtained using a Thermo Analysis Instruments 2920 modulated differential scanning calorimeter using 2200 Thermo Analysis Instruments software. The samples were contained in aluminum pans that were maintained under a nitrogen atmosphere. The temperature scan rate was 10° C./minute.

used were all physical mixtures of BSA and the designated additive, wherein the dry components were physically mixed together. The final set of samples used were all molecular melts of the DPO-BSA with Irganox 1010. For some of the runs, more than one sample was analyzed and the average value obtained from the samples were recorded.

Table 1 also provides, for each sample, a value of the decomposition peak energy released from the sample normalized to the Joules released per gram of DPO-BSA present in that particular sample. This was calculated by multiplying the decomposition peak energy per gram of sample times 1/weight fraction of the DPO-BSA present in that particular sample. This provides a value for the decomposition peak energy released that is directly comparable to the decomposition peak energy released from a sample containing 100% DPO-BSA. These normalized values for the decomposition peak energy released are plotted in FIG. 2.

Figure 2:
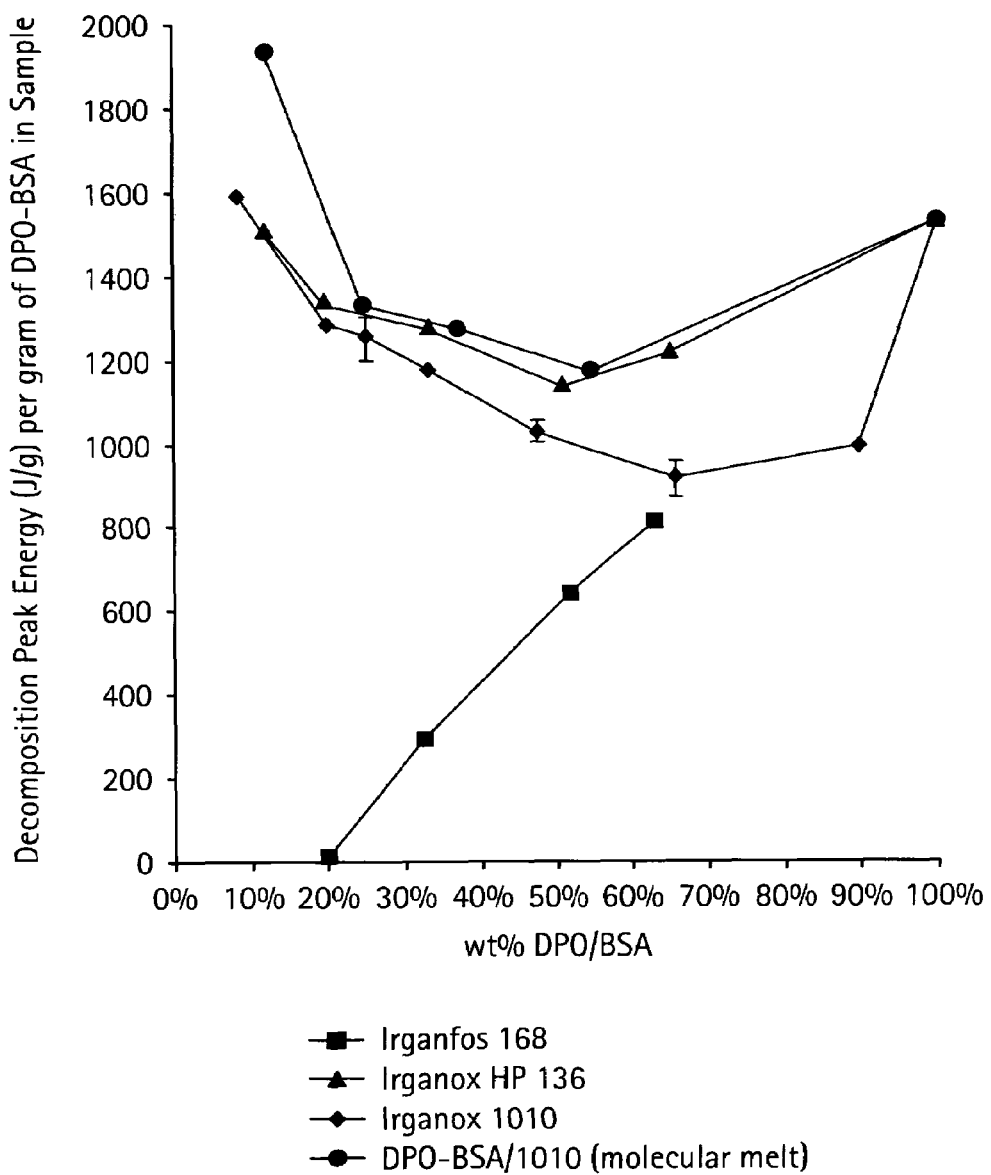
FIG. 2 is graph depicting the decomposition peak energy per gram of DPO-BSA in several samples which contain only DPO-BSA, DPO-BSA in a physical mixture with selected antioxidants, or DPO-BSA in a molecular melt with Irganox 1010.

As can be seen from FIG. 2, the normalized decomposition peak energy released by a sample of molecular melt containing DPO-BSA and Irganox 1010 is higher than the normalized decomposition peak energy released by a sample made from a physical mixture of DPO-BSA and Irganox 1010 that contains equivalent percentages of DPO-BSA and

TABLE 1

| DSC Run | Additive Conc (weight percent) | BSA CONC (weight percent) | Decomp Peak (J/g sample 1) | Decomp Peak (J/g sample 2) | Decomp Peak (J/g sample 3) | Average (J/g sample) | Std. Dev. | Min (J/g sample) | Max (J/g sample) | Minus | Plus | Normalized (J/g DPO-BSA) |
|---|---|---|---|---|---|---|---|---|---|---|---|---|
| Irgafos 168 (physical mixture) | | | | | | | | | | | | |
| Baseline | 0.00% | 100.00% | 1530.9 | | | 1,530.90 | — | 1,530.90 | 1,530.90 | — | — | 1,530.90 |
| 2 | 37.03% | 62.97% | 511.19 | | | 511.19 | — | 511.19 | 511.19 | — | — | 811.78 |
| 3 | 48.19% | 51.81% | 331.5 | | | 331.50 | — | 331.50 | 331.50 | — | — | 639.87 |
| 4 | 67.63% | 32.37% | 94.1 | | | 94.10 | — | 94.10 | 94.10 | — | — | 290.72 |
| 5 | 80.11% | 19.89% | 2.8 | | | 2.80 | — | 2.80 | 2.80 | — | — | 14.08 |
| Irganox 1010 (physical mixture) | | | | | | | | | | | | |
| Baseline | 0.00% | 100.00% | 1530.9 | | | 1,530.90 | — | 1,530.90 | 1,530.90 | — | — | 1,530.90 |
| 2 | 10.22% | 89.78% | 892.2 | | | 892.20 | — | 892.20 | 892.20 | — | — | 993.72 |
| 3 | 34.37% | 65.63% | 600.7 | | | 600.70 | — | 600.70 | 600.70 | — | — | 915.35 |
| 4 | 52.49% | 47.51% | 492 | 439.03 | 527.08 | 486.04 | 44.33 | 439.03 | 527.08 | 47.01 | 41.04 | 1,023.08 |
| 5 | 66.84% | 33.16% | 421.9 | 369.46 | 378.12 | 389.83 | 28.11 | 369.46 | 421.90 | 20.37 | 32.07 | 1,175.73 |
| 6 | 75.09% | 24.91% | 312.49 | | | 312.49 | — | 312.49 | 312.49 | — | — | 1,254.42 |
| 7 | 80.15% | 19.85% | 195.42 | 264.85 | 303.42 | 254.56 | 54.73 | 195.42 | 303.42 | 59.14 | 48.86 | 1,282.39 |
| 8 | 91.62% | 8.38% | 133.34 | | | 133.34 | — | 133.34 | 133.34 | — | — | 1,591.19 |
| Irganox HP136 (physical mixture) | | | | | | | | | | | | |
| Baseline | 0.00% | 100.00% | 1530.9 | | | 1,530.90 | — | 1,530.90 | 1,530.90 | — | — | 1,530.90 |
| 2 | 34.93% | 65.07% | 789.6 | | | 789.60 | — | 789.60 | 789.60 | — | — | 1,213.43 |
| 3 | 49.26% | 50.74% | 574.6 | | | 574.60 | — | 574.60 | 574.60 | — | — | 1,132.36 |
| 4 | 67.04% | 32.96% | 419.29 | | | 419.29 | — | 419.29 | 419.29 | — | — | 1,272.08 |
| 5 | 80.23% | 19.77% | 262.6 | | | 262.60 | — | 262.60 | 262.60 | — | — | 1,328.22 |
| 6 | 88.03% | 11.97% | 179.85 | | | 179.85 | — | 179.85 | 179.85 | — | — | 1,502.50 |
| BSA/1010 (molecular melt) | | | | | | | | | | | | |
| Baseline | 0.00% | 100.00% | 1530.9 | | | 1,530.90 | — | 1,530.90 | 1,530.90 | — | — | 1,530.90 |
| 2 | 45.26% | 54.74% | 639.18 | | | 639.18 | — | 639.18 | 639.18 | — | — | 1,167.57 |
| 3 | 63.01% | 36.99% | 471.23 | | | 471.23 | — | 471.23 | 471.23 | — | — | 1,273.87 |
| 4 | 75.61% | 24.39% | 328.8 | 342.7 | 301.7 | 324.40 | 20.85 | 301.70 | 342.70 | 22.70 | 18.30 | 1,330.04 |
| 5 | 88.07% | 11.93% | 230.23 | | | 230.23 | — | 230.23 | 230.23 | — | — | 1,929.55 |

All the samples were of approximately equivalent size and contained either DPO-BSA alone (the Baseline DSC runs in Table 1) or DPO-BSA with an additive. The samples Irganox 1010. It is believed the higher decomposition peak energies for the molecular melt indicate that the molecular melt is minimizing the self-reaction of the DPO-BSA and/or the reaction between the DPO-BSA and the Irganox 1010 as compared to the sample that is a physical mixture of DPO-BSA and Irganox 1010. When the molecular melt is used to modify a target polymer, this protective action will increase the coupling efficiency of the coupling agent for modifying the target polymer.

Additionally, the data acquired from the physical admixture of the DPO-BSA with Irgafos 168 clearly shows that the presence of a compound containing phosphorous in the +3 oxidation state reduces the decomposition peak energy released by the DPO-BSA and therefore it will reduce the coupling efficiency of the coupling agent unless other steps are taken to reduce this effect. It is believed that the addition of a coupling agent to the target polymer together with an antioxidant, even if not added as a molecular melt, will at least partially protect the coupling agent from reaction with itself and other chemicals compounds, such as compounds containing phosphorous in the +3 oxidative state.

Polymers Modified With Molecular Melt

The molecular melt can be used to modify any target polymer, preferably the target polymer is a styrenic or polyolefin (including ethylene) based polymers. Polyolefins are formed by means within the skill in the art. The alpha olefin monomers and optionally other addition polymerizable monomers are polymerized under conditions within the skill in the art, for instance as disclosed by Galli, et al., *Angew. Macromol. Chem.*, Vol. 120, p. 73 (1984), or by E. P. More, et al. in *Polypropylene Handbook*, Hanser Publishers, New York, 1996, particularly pages 11-98.

Examples of the preferred target polymers include polymers based on ethylene, propylene, and other olefins, as well as styrene, substituted styrene, and/or ethylene styrene interpolymers, as disclosed in U.S. Pat. No. 5,703,187 issued Dec. 30, 1997, whose teachings regarding ethylene styrene interpolymers and methods for making such interpolymer are incorporated by reference herein. The most preferred target polymers are polyolefin-based polymers, including propylene homopolymer, as well as random and impact copolymers of propylene and polyethylene polymers, such as high density (HDPE), medium density (MDPE), linear low density (LLDPE) and low density (LDPE) polyethylenes. Such polymers include terpolymers, tetrapolymers and higher order polymers of propylene, ethylene and other olefins, optionally, dienes and/or trienes.

Impact propylene copolymers are commercially available and are well within the skill in the art, for instance, as described by E. P. Moore, Jr in *Polypropylene Handbook*, Hanser Publishers, 1996, page 220-221 and U.S. Pat. Nos. 3,893,989 and 4,113,802. The term "impact copolymer" is used herein to refer to heterophasic propylene copolymers where polypropylene is the continuous phase and an elastomeric phase is uniformly dispersed therein. The impact copolymers result from an in-reactor process rather than physical blending. Usually the impact copolymers are formed in a dual or multi-stage process, which optionally involves a single reactor with at least two process stages taking place therein, or optionally multiple reactors. Advantageously, the impact copolymers have at least about 5 weight percent, preferably at least about 10, preferably up to about 40, more preferably up to about 25 weight percent, and most preferably up to about 20 weight percent polymeric units derived from ethylene. Illustrative impact copolymer propylene polymers include those available from The Dow Chemical Company under the trade designations Dow C104-01 PP, Dow C105-02 PP, Dow C107-04 PP, and Dow DC-111 PP propylene impact copolymers having melt flow rates of 1, 2, 4, and 0.8 g/10 min, respectively, under a weight of 2.16 kg at a temperature of 230°.

The molecular melt can be utilized to modify blends of polymers, including blends where more than one of the polymers present in the blend is capable of acting as a target polymer. It is believed the coupling agent will at least partially couple one polymer in the blend to another of the blend. Thereby, forming a compatibilizer, which will improve the compatibility of the polymers of the blend for each other.

The following discussion will specifically address the reaction of the coupling agent with polyolefins, however, one of ordinary skill in the art will realize that the teachings herein also apply to the reaction of a coupling agent and/or modifying agent with other target polymers of interest.

The reactive groups of the coupling agent are typically activated by heat, sonic energy, radiation or other chemical activating energy to generate nitrene(s) or/or carbene(s) groups which are capable of reacting with the target polymer. When the coupling agent reacts with a polyolefin, at least two separate polyolefin chains are advantageously joined and the molecular weight of the polymer chain is increased. In a preferred embodiment of the invention where the coupling agent is a bis(sulfonyl azide), two polyolefin chains are advantageously joined.

The more preferred method for activating a coupling agent is to heat the coupling agent to cause decomposition of the reactive groups to form carbene(s) and/or nitrene(s). Each coupling agent will have a characteristic temperature profile, under which it decomposes. This temperature profile can be determined by differential scanning calorimetry analysis. Each coupling agent will have a peak or a series of peak decomposition temperatures, which correspond the decomposition of a particular reactive group. For example, a differential scanning calorimeter (DSC) thermogram of the bis (sulfonyl azide) of diphenyl oxide shows a broad exothermic peak that begins about 130° C., peaks at about 185° C.(referred to herein as the peak decomposition temperature) and is complete by about 220° C. The total amount of energy released due to decomposition of the sulfonyl azide groups in the DPO-BSA is about 1500 Joules/gram.

However, most coupling agents will also decompose at temperatures less than the peak decomposition temperature. Preferably, the target polymers and the molecular melt are well mixed as the reaction between the coupling agent and the target polymer takes place. In some embodiments of the invention, it is preferable to maintain the mixture of molecular melt and target polymer well below the peak decomposition temperature until the coupling reaction is desired to take place.

Any equipment is suitably used for modifying the target polymer. Preferably, equipment which provides sufficient mixing and temperature control in the same equipment is used, but advantageously the practice of the invention takes place in such devices as an extruder, melt mixer, pump conveyor or other or a polymer mixing devise such as a Brabender melt mixer. The term extruder is used for its broadest meaning to include such devices as a device which extrudes articles, including strands or pellets. Preferably the equipment allows a sequence of temperatures or zones having different temperatures. The reaction is especially suitable for an extruder because practice of the invention can occur in a single vessel (that is any single piece of equipment capable of containing polymer). Conveniently, when there is a melt extrusion step between production of the target polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the softening temperature is advantageous for even mixing and for reaching a reaction temperature (which may be well below the peak decomposition temperature determined by DSC for the coupling agent).

In a preferred embodiment the process of the present invention takes place in a single vessel, that is mixing of the molecular melt and target polymer takes place in the same vessel as heating to the decomposition temperature of the coupling agent. The vessel is most preferably a twin-screw extruder, but preferably a single-screw extruder or advantageously a melt mixer, including a batch mixer. The reaction vessel more preferably has at least two zones of different temperatures into which a reaction mixture would pass, the first zone advantageously being at a temperature low enough to minimize any reaction between the coupling agent and the target polymer. In preferred practice, this first zone will mechanically mix the molecular melt and target polymer while simultaneously transporting them to a second zone. Preferably, the target polymer will not be significantly reacted in this first zone. For propylene polymers, the target polymer preferably is not significantly melted in this first zone. The second zone is preferably configured to rapidly mix the molecular melt and target polymer, while at the same time adding sufficient heat to cause the coupling agent to react with the target polymer.

Typically, an extruder is configured and operated in such a manner as to cause a temperature profile across the extruder. The term "temperature profile" is used herein to mean a series of temperatures to which the polymer is exposed. Each temperature is generally associated with a zone of the extruder. As discussed earlier, the temperature series preferably comprises a first temperature in the zone where the target polymer and molecular melt enter the extruder. In this zone the molecular melt and target polymer preferably are physically mixed, but the heat addition and temperature preferably are low enough so as not to cause or to minimize the reaction between the coupling agent and the target polymer. For a system comprised of polypropylene as the target polymer and DPO-BSA as the coupling agent, it has been found that this first temperature should preferably be at or below about 170° C., more preferably at or below about 140° C., most preferably at or below about 130° C., and in some instances at or below about 120° C.

The temperature profile also preferably comprises a second temperature which is typically associated with the second zone of the extruder. In the second zone enough heat is added to cause significant reaction between the coupling agent and the target polymer. This second zone is preferably at a temperature of at least the peak decomposition temperature of the coupling agent. The second zone is preferably followed by one, more preferably four, most preferably at least five additional zones where the polymer is mixed and the temperature is controlled. Within the second and following zones, there preferably is at least one temperature which is at least 5, most preferably at least 20, even more preferably at least 35° C. above the peak decomposition temperature of the coupling agent. For a system comprised of polypropylene as the target polymer and DPO-BSA as the coupling agent, stream temperatures of greater than 250° C. are preferably avoided while there is significant unreacted DPO-BSA in the reaction mixture.

In the description of the temperature profile of the extruder for the invention, unless otherwise stated, the temperatures are the stream temperatures, that is temperatures inside the polymer stream or polymer melt rather than the temperatures of the equipment which are understood by those skilled in the art to be likely to be lower or higher than stream temperatures because of imperfect heat transfer into the polymer or induced shear heating of the polymer. Those skilled in the art can determine the relationship between stream temperature and equipment or gage temperature of particular equipment without undue experimentation. It is known in the art that the polymer stream temperature is advantageously close to the machine set temperature in the initial zones of an extruder, but the polymer stream temperature can often be greater than the machine set temperatures in the latter zones of the extruder as it approaches the exit die of the extruder due to mechanically induced shear heating.

Coupling Agent for Rheological Modification:

Those skilled in the art will recognize that the reactivity of the coupling agent, the coupling agent and the desired or predetermined rheology or amount of chain coupling determine the amount of coupling agent to be used. Determining this amount is within the skill in the art. In this aspect of the invention, formation of substantially crosslinked networks is to be avoided because the resulting material would be intractable; therefore, poly(sulfonyl azide) is preferably limited to that amount which results in chain coupled or rheology modified, (but not substantially crosslinked) polyolefin. However, some applications will tolerate a certain amount of crosslinking (such as foam applications). In general the level of azide used preferably is less than about 1.6 mole coupling agent per mole of target polymer. For films preferably less than about 0.5 weight percent, more preferably less than about 0.20 weight percent, most preferably less than about 0.10 weight percent of the preferred coupling agent poly(sulfonyl azide) based on the total weight of polyolefin, preferably polypropylene or polypropylene/ethylene copolymer blend.

Crosslinking is evidenced by gel formation which is measured in the case of polypropylene by measuring the amount of gels in a cast film, either by eye or camera.

When poly(sulfonyl azide) is used in the practice of the invention, at least about 0.005 weight percent poly(sulfonyl azide) is advantageously used to achieve measurable results, preferably at least about 0.01 weight percent, more preferably at least about 0.02 weight percent. In some instances, it is preferable to use at least about 0.05 weight percent poly(sulfonyl azide) based on total weight of polymer(s).

Coupling Agent for Cross-Linking:

As with rheology modification, those skilled in the art will recognize that the reactivity, the coupling agent used and desired degree of cross-linking will determine the amount of coupling agent used. However, unlike rheology modification, for cross-linking applications, it is necessary to add sufficient coupling agent to form cross-linked networks. This requires a higher concentration of reactive groups capable of forming carbene or nitrene groups be used for each polymer molecule. Typically, the molar ratio of reactive groups to target polymers should be from about 0.9 to about 6.0. In some embodiments, it is preferred to use coupling agents having greater than two reactive groups per coupling agent molecule. This will reduce the amount of coupling agent that must be used. Also, for cross-linked applications, it is typically desirable to minimize the amount of antioxidant added to the target polymer. Therefore, it is preferable in these applications that the molecular melt utilized have a relatively higher molar ratio of coupling agent to antioxidant than the molecular melt typically utilized for rheology modification.

EXAMPLES

Example 1

4,4'-OXYDIBENZENESULFONYL AZIDE (DPO-BSA) Manufacturing Process

Figure 3:
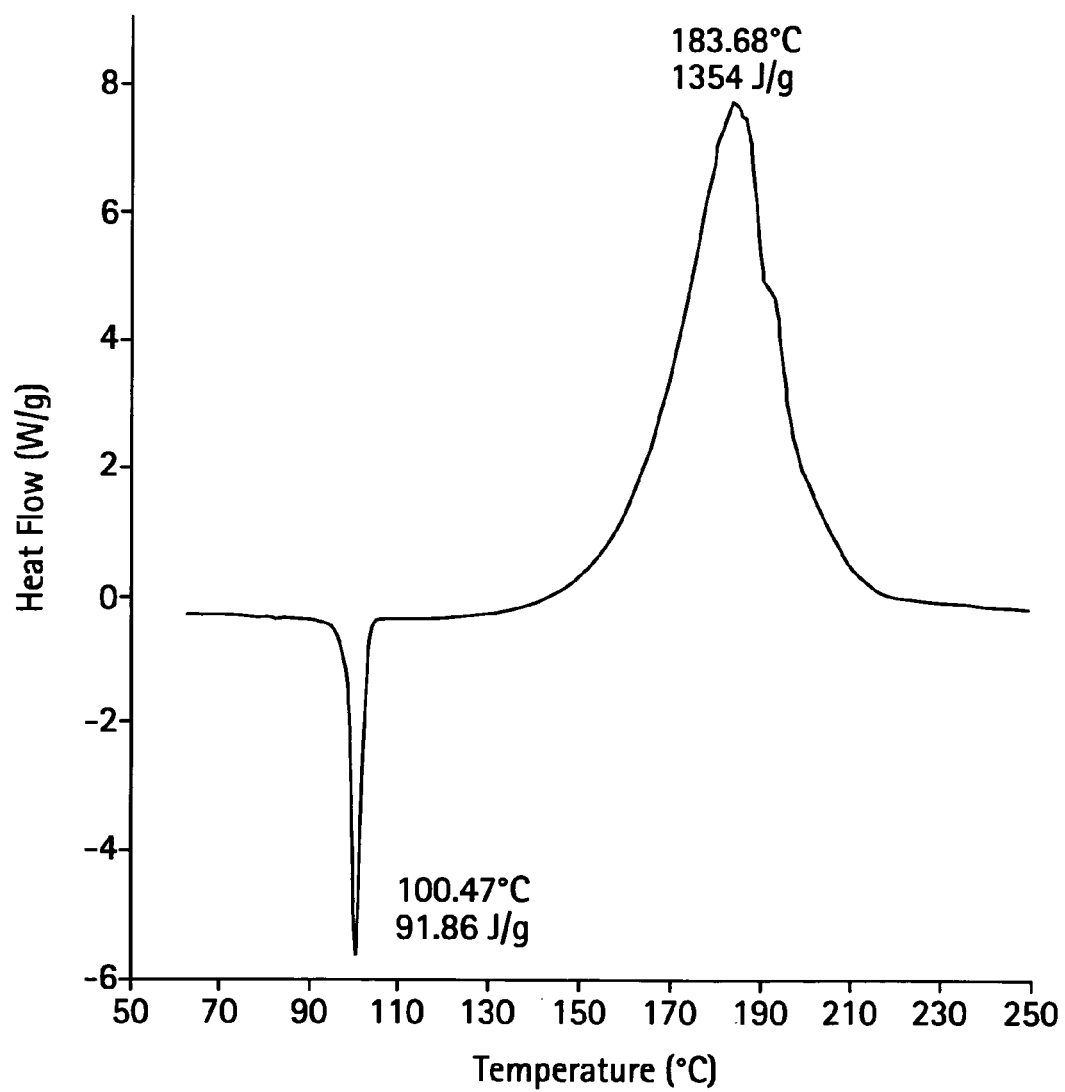
FIG. 3 is a graph depicting the differential scanning calorimetry analysis obtained for DPO-BSA. The DSC shows both the melting point of the DPO-BSA and the peak decomposition energy for the DPO-BSA. The data was obtained using a Thermo Analysis Instruments 2920 modulated differential scanning calorimeter using 2200 Thermo Analysis Instruments software. The samples were contained in aluminum pans that were maintained under a nitrogen atmosphere. The temperature scan rate was 10° C./minute.

DPO-BSA is manufactured in a batch process using a glass lined stirred reactor which is equipped with a jacket for cooling/heating, bottom drain valve, condenser, thermowell, and a nitrogen pad. Toluene from recycle (186.83 g) (recovered from washing the DPO-BSA product crystals) and recovered toluene from the compounding process (66.9 g) is charged to the reactor. This is heated to 50° C. and 96.1 g of 4,4'-oxydibenzenesulfonyl chloride (DPO-BSC) is added while stirring. To the reactor 87.78 g of recycle water from the water wash of the previous reaction is than added and the stirrer set at 150 rpm. 0.24 g of NaHCO3 is then added to neutralize any acid in the solution. When a pH paper confirms that the water phase is neutral then 0.24 g of tetra-n-butyl-ammonium chloride (PTC) is added. To this is added 35 g of sodium azide over fifteen minutes. The stirrer rpm can be increased to 300 to insure proper mixing of the phases. The reactor temperature is increased from 50° C. to 65° C. over 30 minutes. The reaction is 100% converted in 75 minutes as confirmed by Liquid Chromatography analysis. The stirrer is turned off and the phases allowed to separate for 10 minutes. The bottom water/salt phase is removed using the bottom drain valve and sent to the on site incinerator. An additional 29.33 g of 55° C. water is added and the stirrer set at 250 rpm for 5 minutes then turned off and the phases allowed to separate (10 minutes). The bottom phase is again removed and the water extraction step is repeated two more times (2×29.33 g of 55° C. water). The stirrer rpm is reduced to 200 for the subsequent extractions to insure that a permanent emulsion does not occur. All three washes are combined and held for recycle to the next batch. When the water phases have been removed the temperature is cooled to 10° C. and held there for 60 minutes before the bottom valve is opened and the precipitated DPO-BSA slurry transferred into a filter where it is collected and dried to a 40% toluene wet cake under nitrogen. Approximately 101.4 g of DPO-BSA is recovered with the remaining 5.60 g staying in the toluene filtrate. This toluene filtrate is recycled into the next reaction. The 40% toluene wet cake is used directly in the compounding process. FIG. 3 is a DSC of DPO-BSA.

Example 2

4,4'-OXYDIBENZENESULFONYL AZIDE (DPO-BSA) Melt Blend Compounding Process to Manufacture DPO-BSA:I-1010 in a 1:3.3 Weight Ratio (1.0:1.066 Molar Ratio) Molecular Melt (Molecular Melt Sample A)

Figure 4:
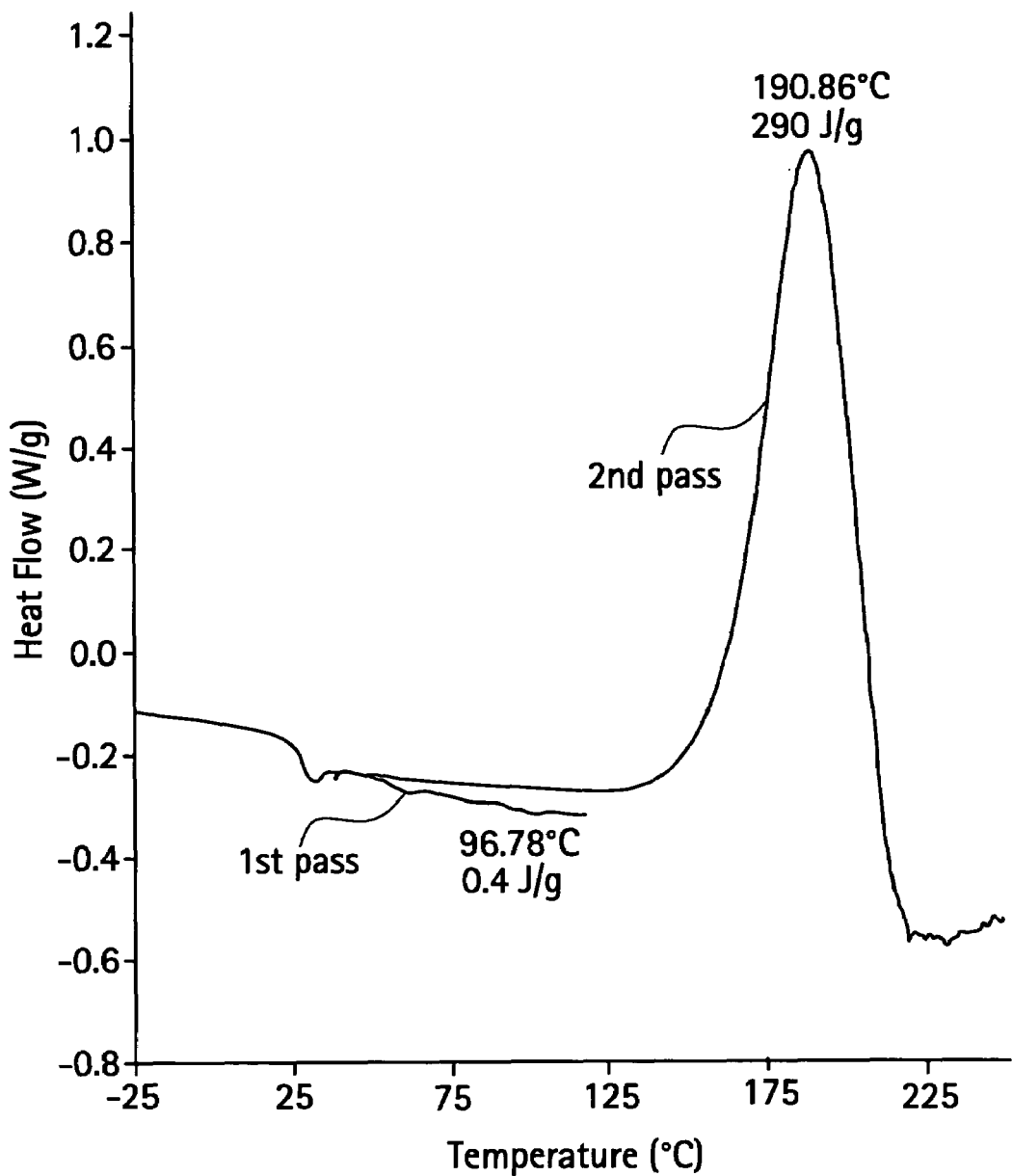
FIG. 4 is a graph depicting the differential scanning calorimetry analysis obtained for molecular melt sample A. The data was obtained in two passes, a first pass from which the total crystallinity of the sample is determined and a second pass which shows the peak decomposition energy for the molecular melt. The data was obtained using a Thermo Analysis Instruments 2920 modulated differential scanning calorimeter using 2200 Thermo Analysis Instruments software. The samples were contained in aluminum pans that were maintained under a nitrogen atmosphere. The temperature scan rate was 10° C./minute.

DPO-BSA, obtained from example 1, is compounded in a batch process using a glass lined stirred reactor which is equipped with a jacket for cooling/heating, bottom drain valve, condenser, thermowell, and a nitrogen sparge. 4,4'-Oxydibenzenesulfonyl Azide (DPO-BSA) (101.4 g) as a wet cake (total weight of wet cake is 168.2 g, contains 40% toluene) is charged to the reactor, stirring commenced and the temperature is raised to 88° C. resulting in a clear solution. IRGANOX® 1010 (I-1010) (334.6 g) is added into mixture and stirred till a clear solution results at 94° C. The reactor is sealed and evacuated as the temperature is raised to 97° C. while toluene (66.7 g) is collected from the overhead (2 hours) and is recovered for recycle to the DPO-BSA manufacturing process. A subsurface nitrogen sparge is used in the final hour to aid in removing the toluene. When the batch is dry, the compounded polymer additive formulation is kept at 97° C. and dripped dropwise into 3000 g rapidly stirred water, cooled to 25° C., and filtered on coarse frit. The product is then washed using 500 ml water, and dried in a rotary drier at 40° C./10 mm Hg. The product is a free flowing powder which is not shock sensitive and can be handled with no special precautions. Analysis by high pressure liquid chromatography (HPLC) shows the composition of this molecular melt to be 23.7 wt. % DPO-BSA and 76.3 wt. % IRGANOX® I-1010. Differential scanning calorimetry analysis determined that the DPO-BSA:Irganox-1010 molecular melt formed by this procedure exhibited a total crystallinity of 0.42 weighted average weight percent. The weighted average weight percent is calculated by dividing the integrated melt endotherm (in J/g) by the sum of the products of the melt endotherms of the neat components multiplied by their individual weight percentages of the total molecular melt. FIG. 4 shows the differential scanning calorimetry results for Molecular Melt Sample A.

Example 3

DPO-BSA Co-Precipitation Process to Manufacture DPO-BSA:I-1010 in a 1:3.3 Weight Ratio (1.0:1.066 Molar Ratio) Molecular Melt (Molecular Melt Sample B)

Figure 5:
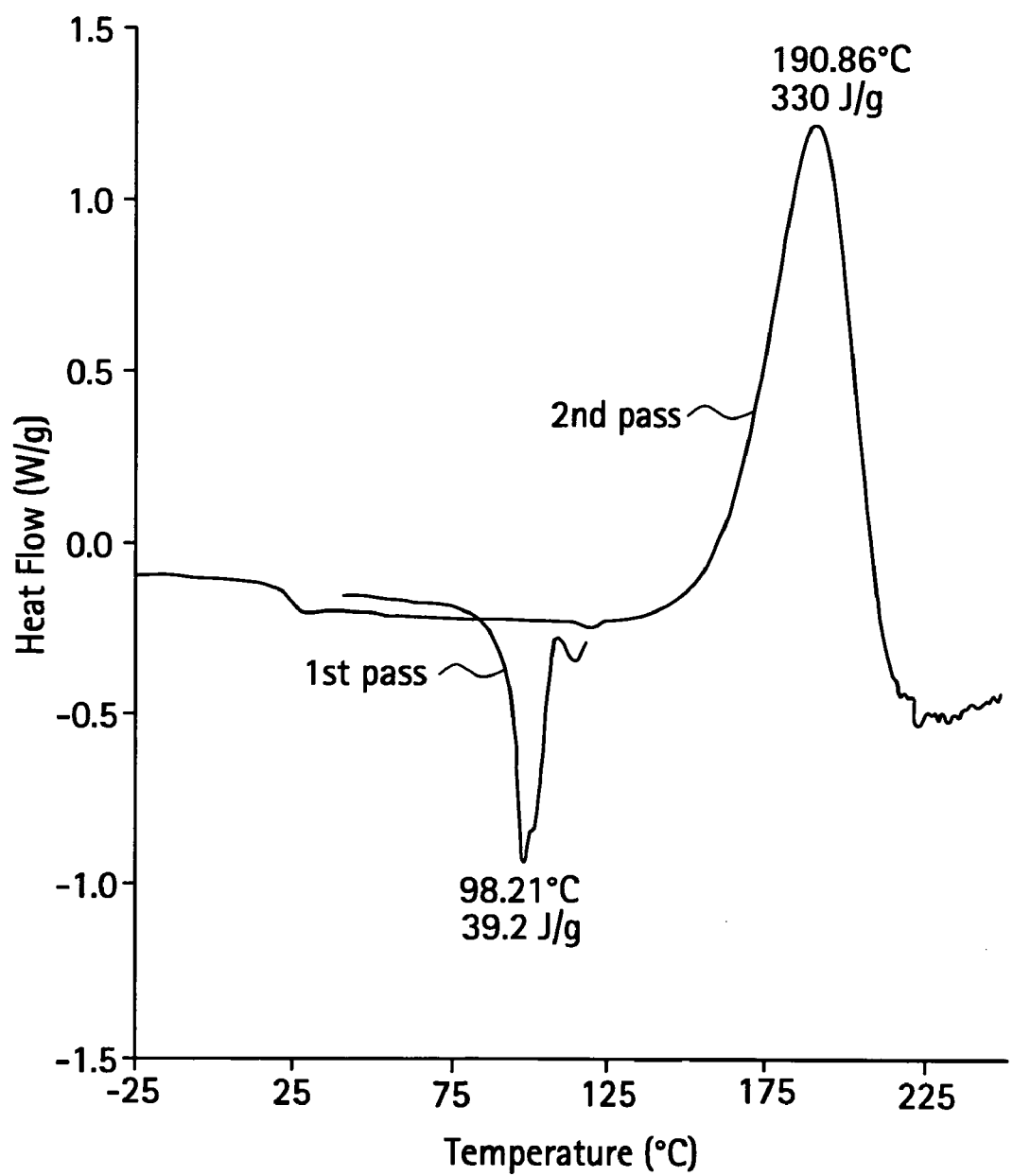
FIG. 5 is a graph depicting the differential scanning calorimetry analysis obtained for molecular melt sample B. The data was obtained in two passes, a first pass from which the total crystallinity of the sample is determined and a second pass which shows the peak decomposition energy for the molecular melt. The data was obtained using a Thermo Analysis Instruments 2920 modulated differential scanning calorimeter using 2200 Thermo Analysis Instruments software. The samples were contained in aluminum pans that were maintained under a nitrogen atmosphere. The temperature scan rate was 10° C./minute.

DPO-BSA, obtained as in Example 1, is compounded in a batch process using a glass lined stirred reactor which is equipped with a jacket for cooling/heating, bottom drain valve, condenser, thermowell, and a nitrogen sparge. 4,4'-Oxydibenzenesulfonyl Azide (DPO-BSA) (25.6 g) is charged to the reactor followed by 100 g of acetonitrile, stirring commenced and the temperature is raised to 60° C. resulting in a clear solution. IRGANOX® I-1010 (84.37 g) is added into the mixture and stirred till a clear solution results at 60° C. The reactor is sealed and evacuated as the temperature is maintained at 67° C. while acetonitrile (90 g) is collected from the overhead (2 hours) and is recovered for recycle. A subsurface nitrogen sparge is used in the final hour to aid in removing the acetonitrile. At this time, the molten compounded polymer additive formulation is kept at 57° C. and dripped dropwise into 3000 g rapidly stirred water, cooled to 25° C., and filtered on coarse frit. The product was then washed using 500 ml water, and dried in a rotary drier at 40° C./10 mm Hg. The product is a free flowing powder which is not shock sensitive and can be handled with no special precautions. Analysis by HPLC shows the composition of this molecular melt to be 23.7 wt. % DPO-BSA and 76.3 wt. % IRGANOX® I-1010. Differential scanning calorimetry analysis determined that the DPO-BSA:Irganox-1010 molecular melt formed by this procedure exhibited a total crystallinity of 43.7 weighted average weight percent. FIG. 5 shows the differential scanning calorimetry results for Molecular Melt Sample B.

Example 4

4,4'-OXYDIBENZENESULFONYL AZIDE (DPO-BSA) Melt Blend Compounding Process to Manufacture DPO-BSA:I-1010 in a 1:1.7 Weight Ratio (1.82:1 Molar Ratio) Molecular Melt (Molecular Melt Sample C)

Figure 6:
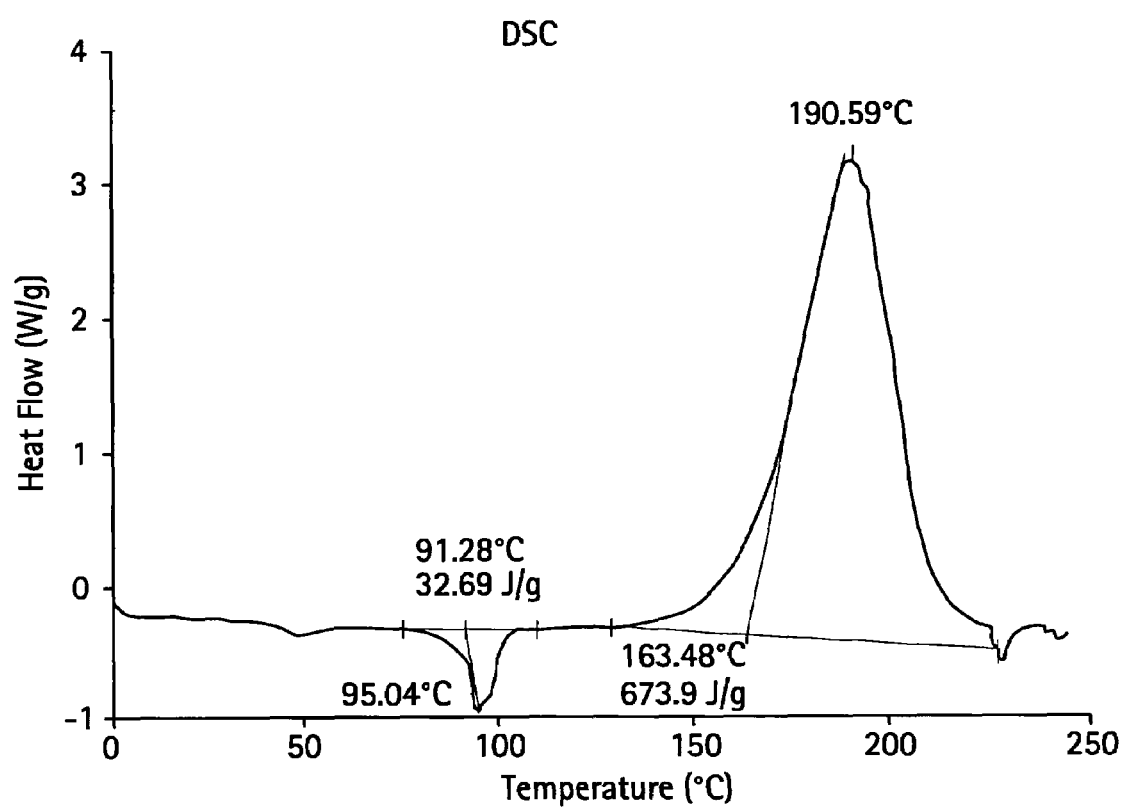
FIG. 6 is a graph depicting the differential scanning calorimetry analysis obtained for molecular melt sample C. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Methylene chloride (3664 g) is charged to the reactor followed by 4,4'-Oxydibenzenesulfonyl Azide (DPO-BSA) (567.84 g) and IRGANOX® I-1010 (965.32 g), stirring commenced and the temperature is raised to 88° C. resulting in a clear solution. Methylene chloride is taken overhead from the mixture till a clear melt results at 94° C. The reactor is sealed and evacuated as the temperature is raised to 97° C. while methylene chloride (3600 g) is collected from the overhead (1.5 hours) and is recovered for recycle to the DPO-BSA compounding process. A subsurface nitrogen sparge is used in the final hour to aid in removing the methylene chloride. When the batch is dry, the compounded polymer additive formulation is kept at 97° C. and poured into a pan (32×18×4 inches), cooled to 25° C., and ground in a Franklin Miller grinder to obtain particles in the range of 200 to 2000 microns. The product was then dried in a rotary drier at 40° C./10 mm Hg. The product is a free flowing powder which is not shock sensitive and can be handled with no special precautions. Analysis by HPLC shows the composition of this molecular melt to be 37.04 wt. % DPO-BSA and 62.96 wt. % IRGANOX® I-1010. Differential scanning calorimetry analysis determined that the DPO-BSA:Irganox-1010 molecular melt formed by this procedure exhibited a total crystallinity of 48.15 weighted average weight percent. FIG. 6 shows the differential scanning calorimetry results for Molecular Melt Sample C.

Example 5

4,4'-OXYDIBENZENESULFONYL AZIDE (DPO-BSA) Melt Blend Compounding Process to Manufacture DPO-BSA:I-1010 in a 1:0.825 Weight Ratio (3.75:1 Molar Ratio) Molecular Melt (Molecular Melt Sample D)

Figure 7:
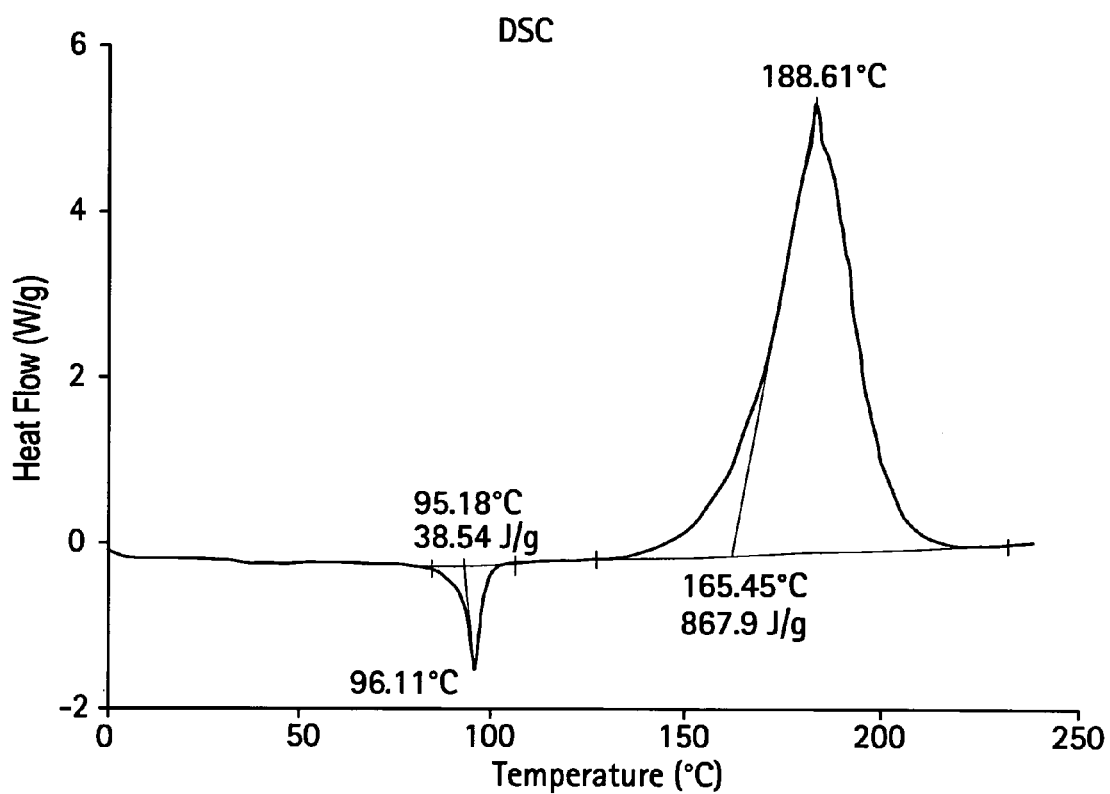
FIG. 7 is a graph depicting the differential scanning calorimetry analysis obtained for molecular melt sample D. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Methylene chloride (4130 g) is charged to the reactor followed by 4,4'-Oxydibenzenesulfonyl Azide (DPO-BSA) (640.14 g) and IRGANOX® I-1010 (528.10 g), stirring commenced and the temperature is raised to 88° C. resulting in a clear solution. Methylene chloride is taken overhead from the mixture till a clear melt results at 94° C. The reactor is sealed and evacuated as the temperature is raised to 97° C. while methylene chloride (4022 g) is collected from the overhead (1.5 hours) and is recovered for recycle to the DPO-BSA compounding process. A subsurface nitrogen sparge is used in the final hour to aid in removing the methylene chloride. When the batch is dry, the compounded polymer additive formulation is kept at 97° C. and poured into a pan (32×18×4 inches), cooled to 25° C., and ground in a Franklin Miller grinder to obtain particles in the range of 200 to 2000 microns. The product was then dried in a rotary drier at 40° C./10 mm Hg. The product is a free flowing powder which is not shock sensitive and can be handled with no special precautions. Analysis by HPLC shows the composition of this molecular melt to be 54.79 wt. % DPO-BSA and 45.21 wt. % IRGANOX® I-1010. Differential scanning calorimetry analysis determined that the DPO-BSA:Irganox-1010 molecular melt formed by this procedure exhibited a total crystallinity of 51.09 weighted average weight percent. FIG. 7 shows the differential scanning calorimetry results for Molecular Melt Sample D.

Example 6

4,4'-OXYDIBENZENESULFONYL AZIDE (DPO-BSA) Melt Blend Compounding Process to Manufacture DPO-BSA:I-1010 in a 1:6.6 Weight Ratio (1:2.13 Molar Ratio) Molecular Melt (Molecular Melt Sample E)

Figure 8:
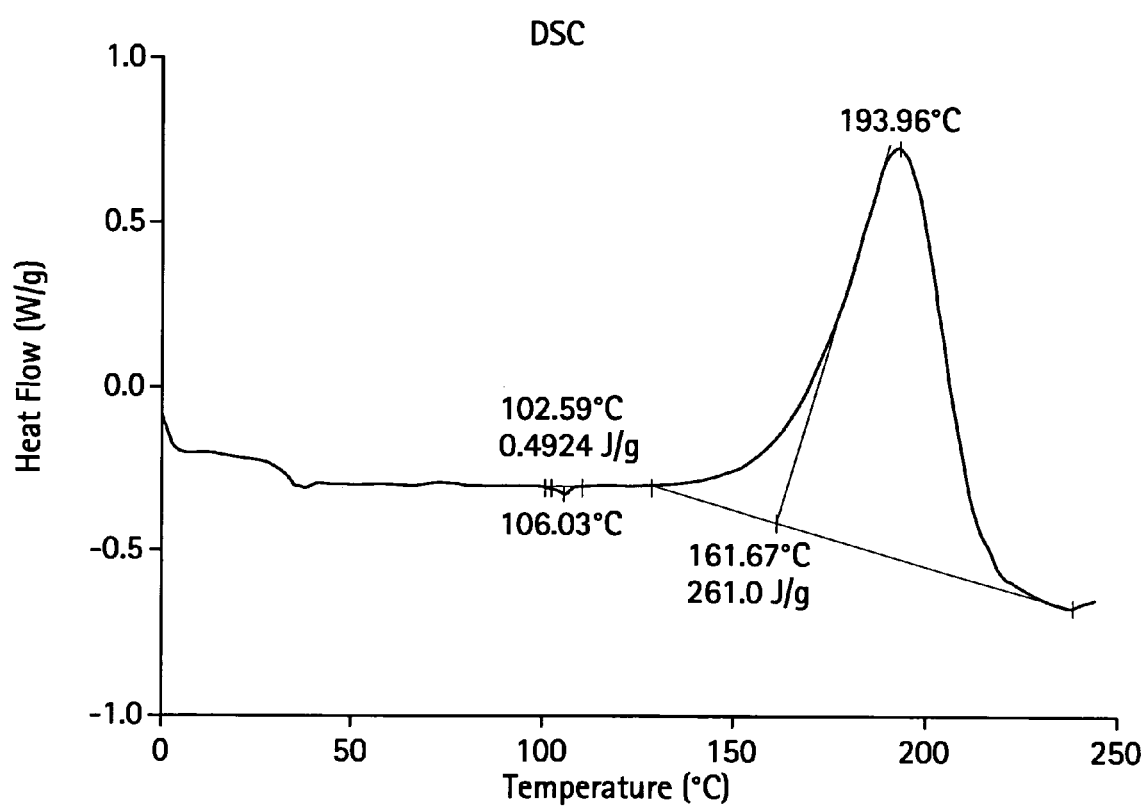
FIG. 8 is a graph depicting the differential scanning calorimetry analysis obtained for molecular melt sample E. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Methylene chloride (2580 g) is charged to the reactor followed by 4,4'-Oxydibenzenesulfonyl Azide (DPO-BSA) (400.00 g) and IRGANOX® I-1010 (2640.00 g), stirring commenced and the temperature is raised to 88° C. resulting in a clear solution. Methylene chloride is taken overhead from the mixture till a clear melt results at 94° C. The reactor is sealed and evacuated as the temperature is raised to 97° C. while methylene chloride (2376 g) is collected from the overhead (1.5 hours) and is recovered for recycle to the DPO-BSA compounding process. A subsurface nitrogen sparge is used in the final hour to aid in removing the methylene chloride. When the batch is dry, the compounded polymer additive formulation is kept at 97° C. and poured into a pan (32×18×4 inches), cooled to 25° C., and ground in a Franklin Miller grinder to obtain particles in the range of 200 to 2000 microns. The product was then dried in a rotary drier at 40° C./10 mm Hg. The product is a free flowing powder which is not shock sensitive and can be handled with no special precautions. Analysis by HPLC shows the composition of this molecular melt to be 13.16 wt. % DPO-BSA and 86.84 wt. % IRGANOX® I-1010. Differential scanning calorimetry analysis determined that the DPO-BSA:Irganox-1010 molecular melt formed by this procedure exhibited a total crystallinity of 0.82 weighted average weight percent. FIG. 8 shows the differential scanning calorimetry results for Molecular Melt Sample E.

Example 7

4,4'-OXYDIBENZENESULFONYL AZIDE (DPO-BSA) Melt Blend Compounding Process to Manufacture DPO-BSA:I-1010 in a 1:3.3 Weight Ratio (1:1.066 Molar Ratio) Molecular Melt, Large Scale Example (Molecular Melt Sample F)

Figure 9:
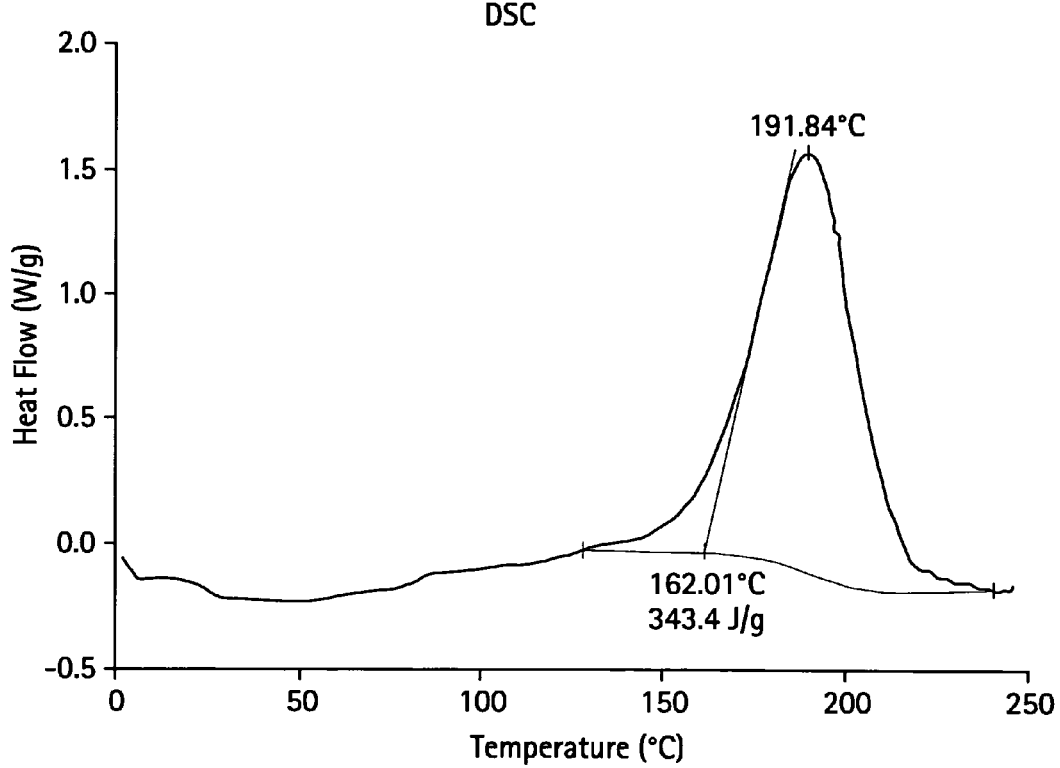
FIG. 9 is a graph depicting the differential scanning calorimetry analysis obtained for molecular melt sample F. The data was obtained in a single pass using a Thermo Analysis Instruments DSC V2.6D dual-cell differential scanning calorimeter. There was no discernable endotherm present from the DSC and therefore, the total crystallinity was determined to be 0%. The peak decomposition energy is shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Methylene chloride (129.42 kg) is charged to the reactor followed by 4,4'-Oxydibenzenesulfonyl Azide (DPO-BSA) (20.06 kg) and IRGANOX® I-1010 (66.20 kg), stirring commenced and the temperature is raised to 38° C. resulting in a clear solution. Methylene chloride is taken overhead from the mixture till a clear melt results at 94° C. The reactor is sealed and evacuated as the temperature is raised to 97° C. while methylene chloride (128.2 kg) is collected from the overhead (1.5 hours) and is recovered for recycle to the DPO-BSA compounding process. A subsurface nitrogen sparge is used in the final hour to aid in removing the methylene chloride. When the batch is dry, the compounded polymer additive formulation is kept at 97° C. and poured into 10 pans (32×18×4 inches), cooled to 25° C., and ground in a Franklin Miller grinder to obtain particles in the range of 200 to 2000 microns. The product was then dried in a rotary drier at 40° C./10 mm Hg. The product is a free flowing powder which is not shock sensitive and can be handled with no special precautions. Analysis by HPLC shows the composition of this molecular melt to be 23.26 wt. % DPO-BSA and 76.74 wt. % IRGANOX® I-1010. Differential scanning calorimetry analysis determined that the DPO-BSA:Irganox-1010 molecular melt formed by this procedure exhibited a total crystallinity of 0.00 weighted average weight percent. FIG. 9 shows the differential scanning calorimetry results for Molecular Melt Sample F.

The following examples describe additional compounds that can function as the antioxidant portion of molecular melt compositions.

Example 8

4,4'-OXYDIBENEZENESULFONYL AZIDE (DPO-BSA) Melt Blend Compounding Process to Manufacture DPO-BSA: Chimassorb 944 in a 1:6.575 Weight Ratio (1:1 Molar Ratio) Molecular Melt (Molecular Melt Sample G)

The following example demonstrates that chemical compounds that may not typically be referred to as antioxidants, but are considered as antioxidants for use in the molecular melt.

Figure 11:
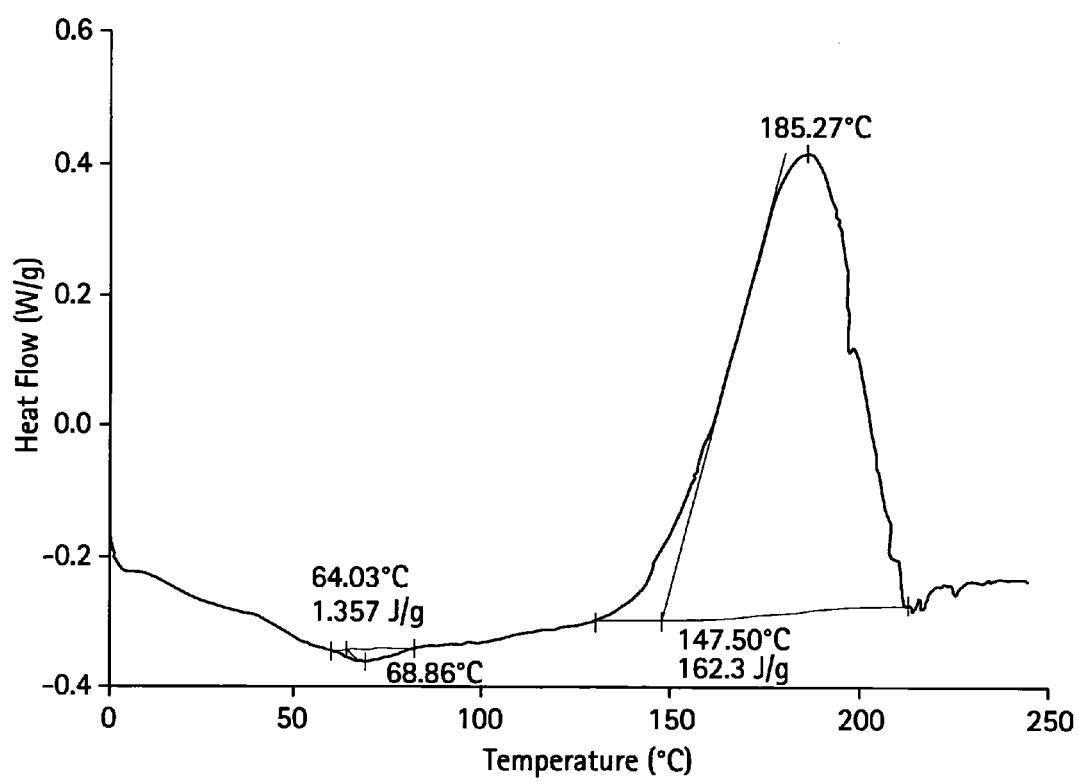
FIG. 11 is a graph depicting the differential scanning calorimetry analysis obtained for molecular melt sample G. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Toluene (20.00 g) is charged to the reactor followed by 4,4'-Oxydibenezenesulfonyl Azide (DPO-BSA) (2.00 g) and (Poly-[[6-(1,1,3,3-tetramethylbutyl)amino]-s-triazine-2,4-diyl] [2,2,6,6-tetramethyl-4-piperidyl)imino])(13.15 g) (a hindered amine light stabilizer available from the Ciba Specialty Chemicals Company under the trade name Chimassorb® 944), stirring commenced and the temperature is raised to 80° C. resulting in a clear solution. Toluene is taken overhead under vacuum, from the mixture till a clear melt results at 85° C. When the batch is dry, the compounded polymer additive formulation is kept at 85° C. and poured into a watch glass, cooled to 25° C. The product was then dried in a vacuum oven at 40° C./1.0 mm Hg. The product is a free flowing powder which is not shock sensitive and can be handled with no special precautions. Analysis by HPLC shows the composition of this molecular melt to be 13.16 wt. % DPO-BSA and 86.84 wt. % Chimassorb® 944. Differential scanning calorimetry analysis determined that the DPO-BSA: Chimassorb® 944 molecular melt formed by this procedure exhibited a total crystallinity of 13.3% weighted average weight percent. FIG. 11 shows the differential scanning calorimetry results for Molecular Melt Sample G.

Figure 12:
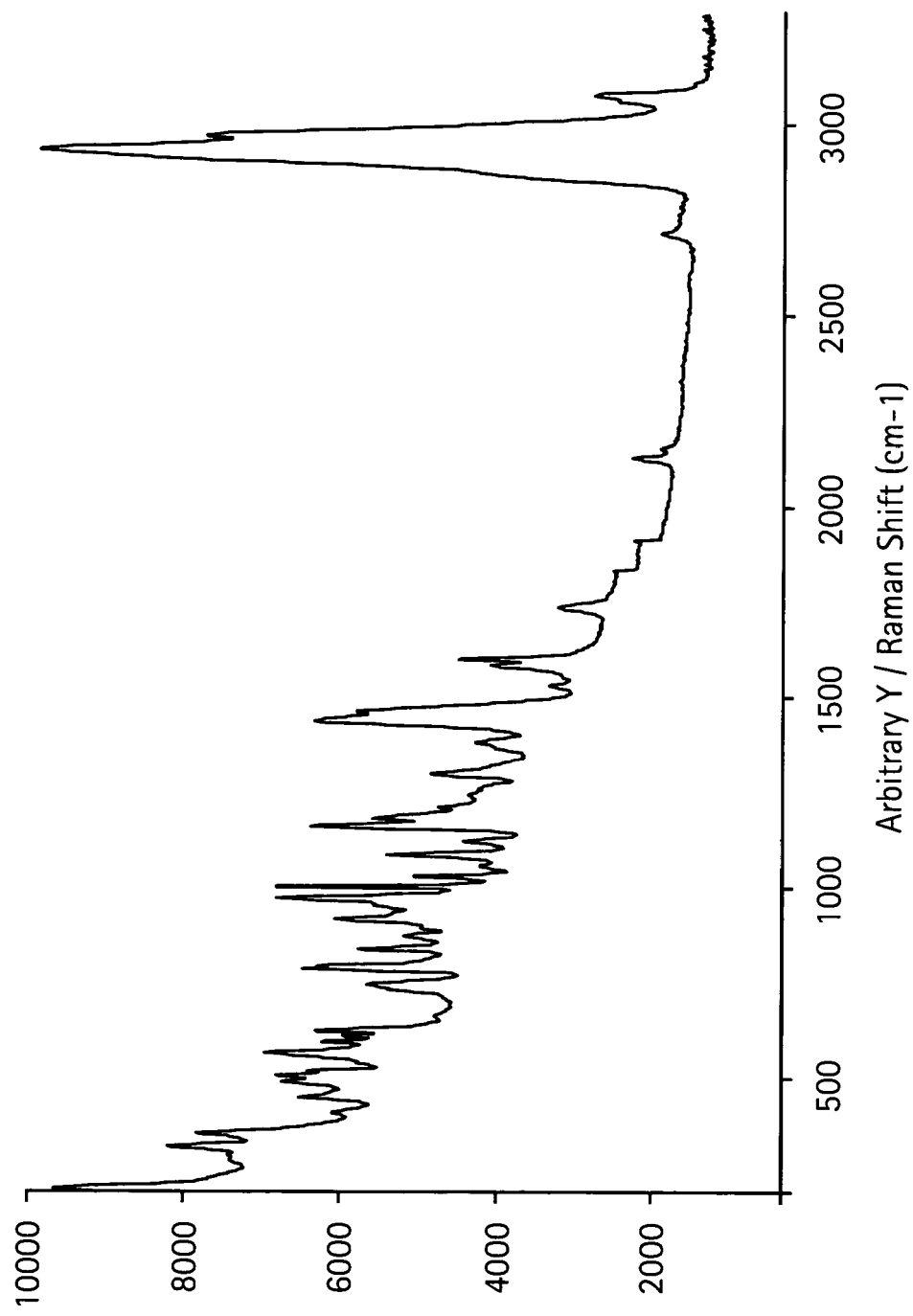
FIG. 12 is a depiction of the Raman Spectra obtained from a molecular melt containing DPO-BSA and Chimassorb 944.

As can be seen from the Raman spectra of FIG. 12, the molecular melt composition of Sample G exhibits a doublet at approximately 2100. The left peak of the doublet is due to the DPO-BSA, the right peak of the doublet is due to the interaction of the DPO-BSA with the Chimassorb 944.

Example 9

4,4'-OXYDIBENEZENESULFONYL AZIDE (DPO-BSA) Melt Blend Compounding Process to Manufacture DPO-BSA : Lactone (HP 136) in a 1:0.925 Weight Ratio (1:1 Molar Ratio) Molecular Melt (Molecular Melt Sample H)

Figure 13:
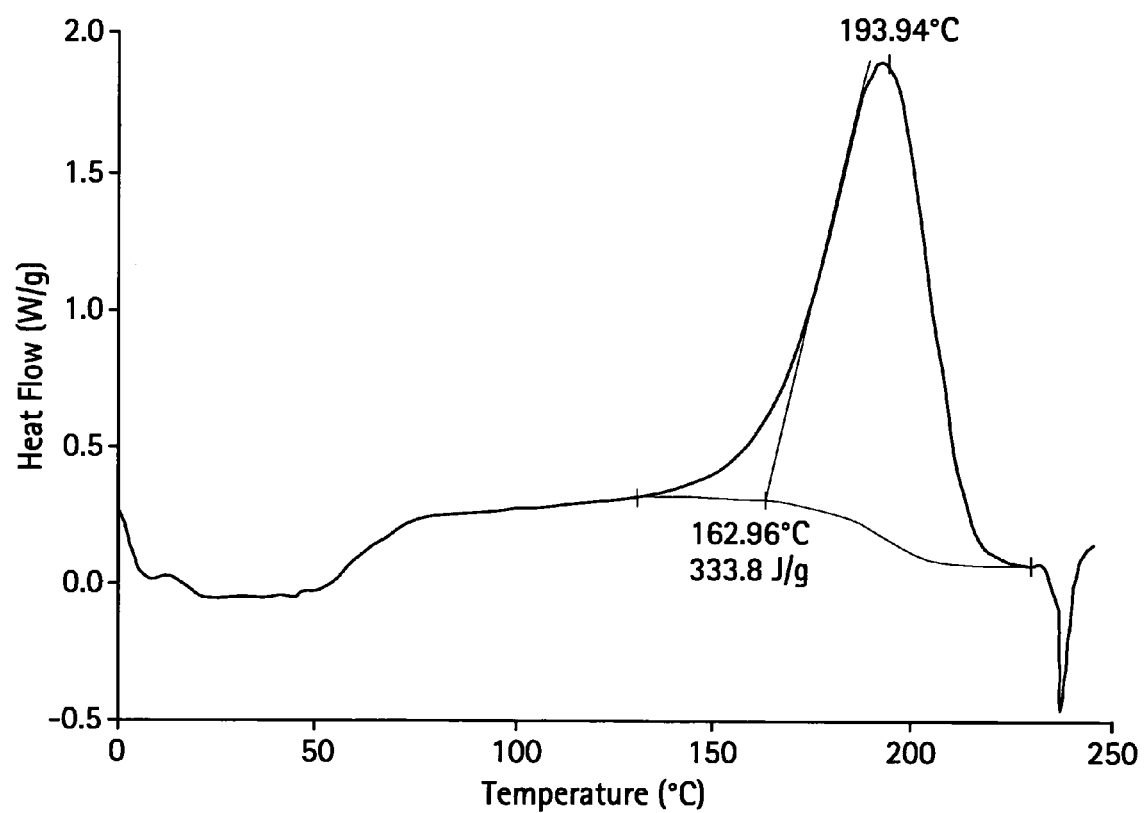
FIG. 13 is a graph depicting the differential scanning calorimetry analysis obtained for molecular melt sample H. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Toluene (20.00 g) is charged to the reactor followed by 4,4'-Oxydibenezenesulfonyl Azide (DPO-BSA) (2.00 g) and (5,7-bis(1,1-dimethylethyl)-3-hydroxy-2(3H)-benzofuranone reaction products with o-xylene)(1.85 g) (a lactone based antioxidant available from the Ciba Specialty Chemicals Company under the trade name IRGANOX HP 136®), stirring commenced and the temperature is raised to 80° C. resulting in a clear solution. Toluene is taken overhead under vacuum, from the mixture till a clear melt results at 85° C. When the batch is dry, the compounded polymer additive formulation is kept at 85° C. and poured into a 100 ml bottle, cooled to 25° C. The product was then dried in a vacuum oven at 40° C./1.0 mm Hg. The product is a free flowing powder which is not shock sensitive and can be handled with no special precautions. Analysis by HPLC shows the composition of this molecular melt to be 52.0 wt. % DPO-BSA and 48.0 wt. % HP 136®. Differential scanning calorimetry analysis determined that the DPO-BSA: HP 136® molecular melt formed by this procedure exhibited a total crystallinity of 0.0% weighted average weight percent. FIG. 13 shows the differential scanning calorimetry results for Molecular Melt Sample H.

Figure 14:
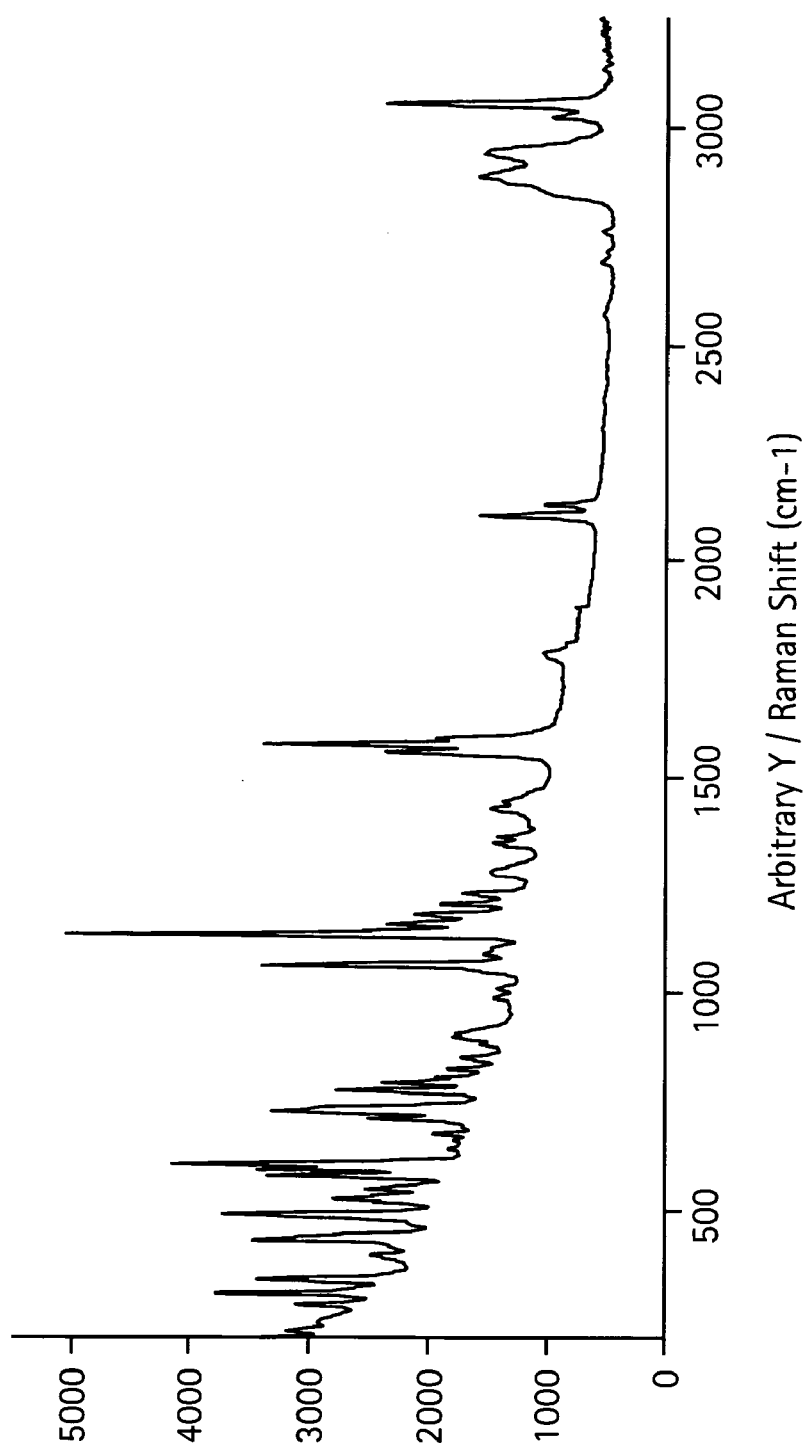
FIG. 14 is a depiction of the Raman Spectra obtained from a molecular melt containing DPO-BSA and Irganox HP 136.

As can be seen from the Raman spectra of FIG. 14, the molecular melt composition of Sample H exhibits a doublet at approximately 2100 cm$^{-1}$. The left peak of the doublet is due to the DPO-BSA, the right peak of the doublet is due to the interaction of the DPO-BSA with the HP 136.

Example 10

4,4'-OXYDIBENEZENESULFONYL AZIDE (DPO-BSA) Melt Blend Compounding Process to Manufacture DPO-BSA: I-245 in a 1:1.543 Weight Ratio (1:1 Molar Ratio) Molecular Melt (Molecular Melt Sample I)

Figure 15:
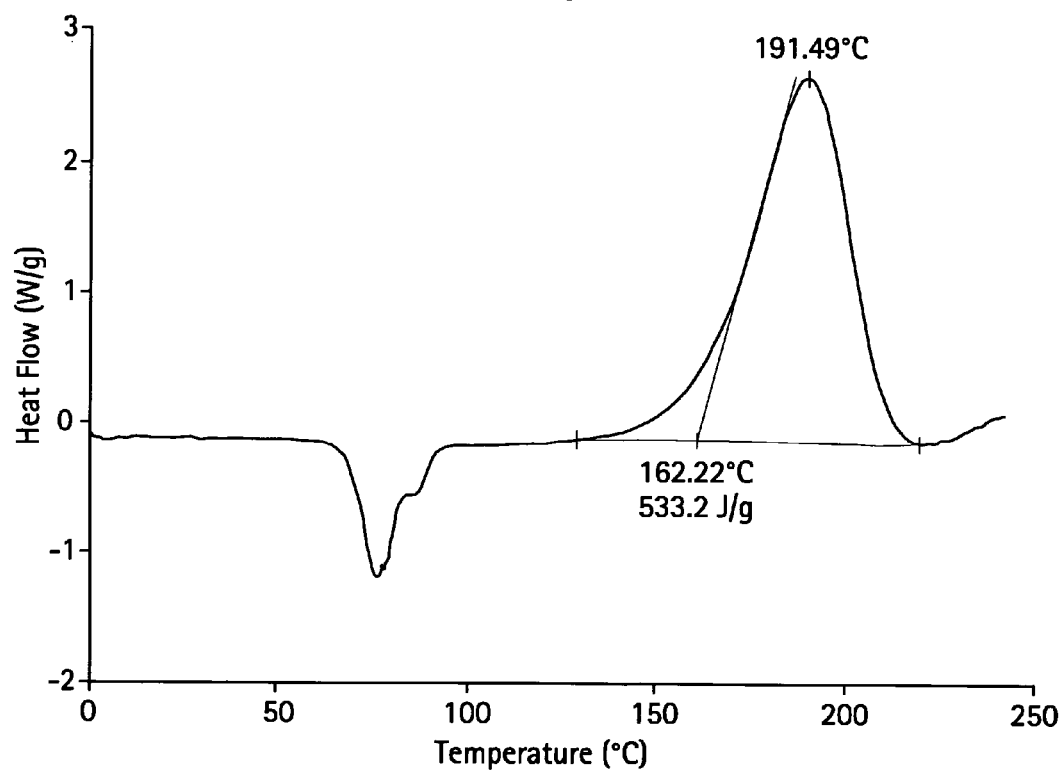
FIG. 15 is a graph depicting the differential scanning calorimetry analysis obtained for molecular melt sample I. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Toluene (20.00 g) is charged to the reactor followed by 4,4'-Oxydibenezenesulfonyl Azide (DPO-BSA) (3.00 g) and (ethylenebis(oxyethylene)bis-(3-(5-tert-butyl-4-hydroxy-m-tolyl)-propionate))(1.85 g) (an antioxidant available from the Ciba Specialty Chemicals Company under the trade name IRGANOX® I-245), stirring commenced and the temperature is raised to 80° C. resulting in a clear solution. Toluene is taken overhead under vacuum, from the mixture till a clear melt results at 85° C. When the batch is dry, the compounded polymer additive formulation is kept at 85° C. and poured into a 100 ml bottle, cooled to 25° C. The product was then dried in a vacuum oven at 40° C./1.0 mm Hg. The product is a free flowing powder which is not shock sensitive and can be handled with no special precautions. Analysis by HPLC shows the composition of this molecular melt to be 39.3 wt. % DPO-BSA and 60.6 wt. % IRGANOX® I-245. Differential scanning calorimetry analysis determined that the DPO-BSA: I-245 molecular melt formed by this procedure exhibited a total crystallinity of 0.0% weighted average weight percent. FIG. 15 shows the differential scanning calorimetry results for Molecular Melt Sample I.

Figure 16:
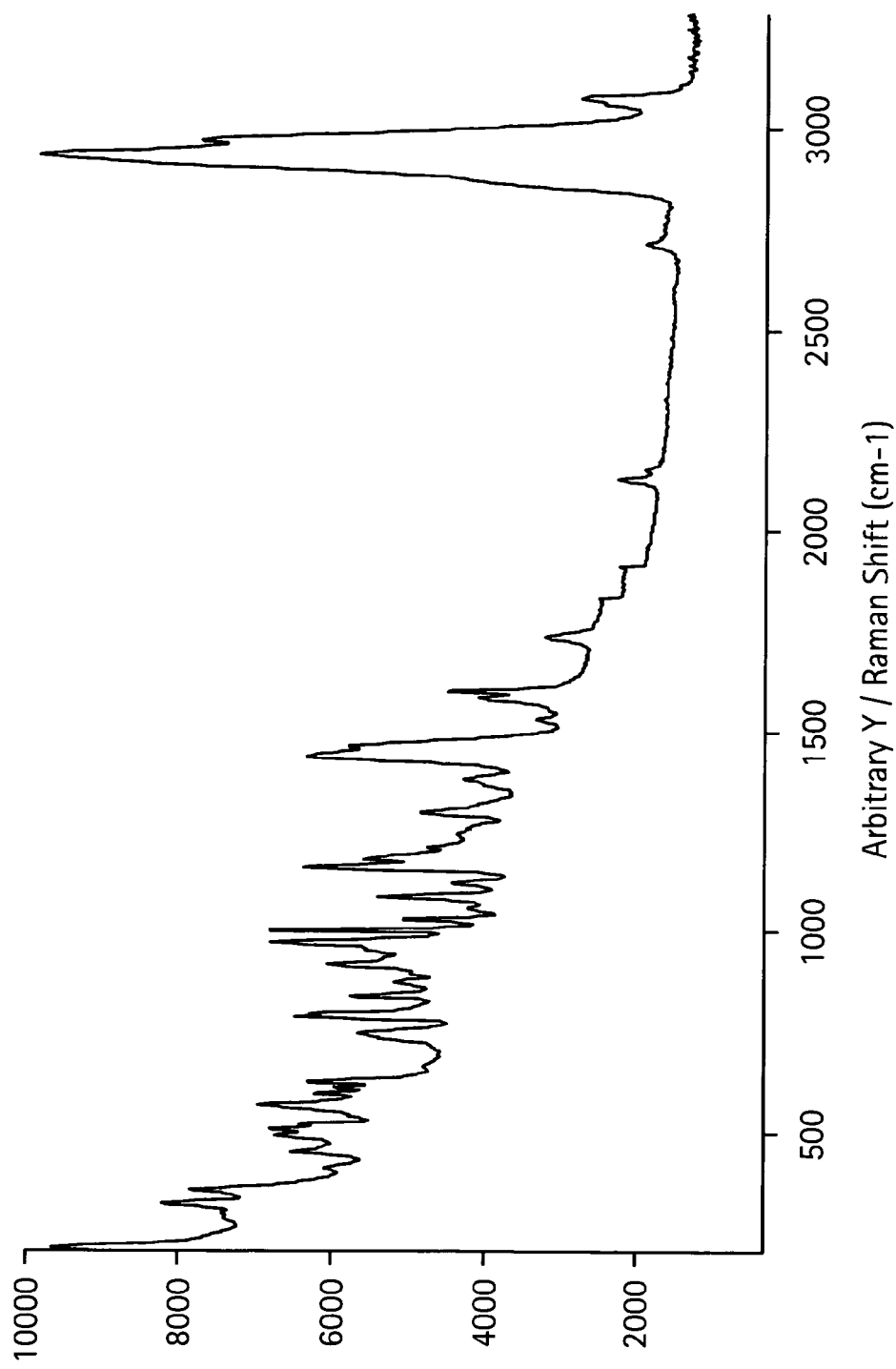
FIG. 16 is a depiction of the Raman Spectra obtained from a molecular melt containing DPO-BSA and Irganox I-245.

As can be seen from the Raman spectra of FIG. 16, the molecular melt composition of Sample I exhibits a doublet at approximately 2100 cm$^{-1}$. The left peak of the doublet is due to the DPO-BSA, the right peak of the doublet is due to the interaction of the DPO-BSA with the Irganox I-245.

Example 11

4,4'-OXYDIBENEZENESULFONYL AZIDE (DPO-BSA) Melt Blend Compounding Process to Manufacture DPO-BSA: I-1425 in a 1:0.55 Weight Ratio (1:1 Molar Ratio) Molecular Melt (Molecular Melt Sample J)

Figure 17:
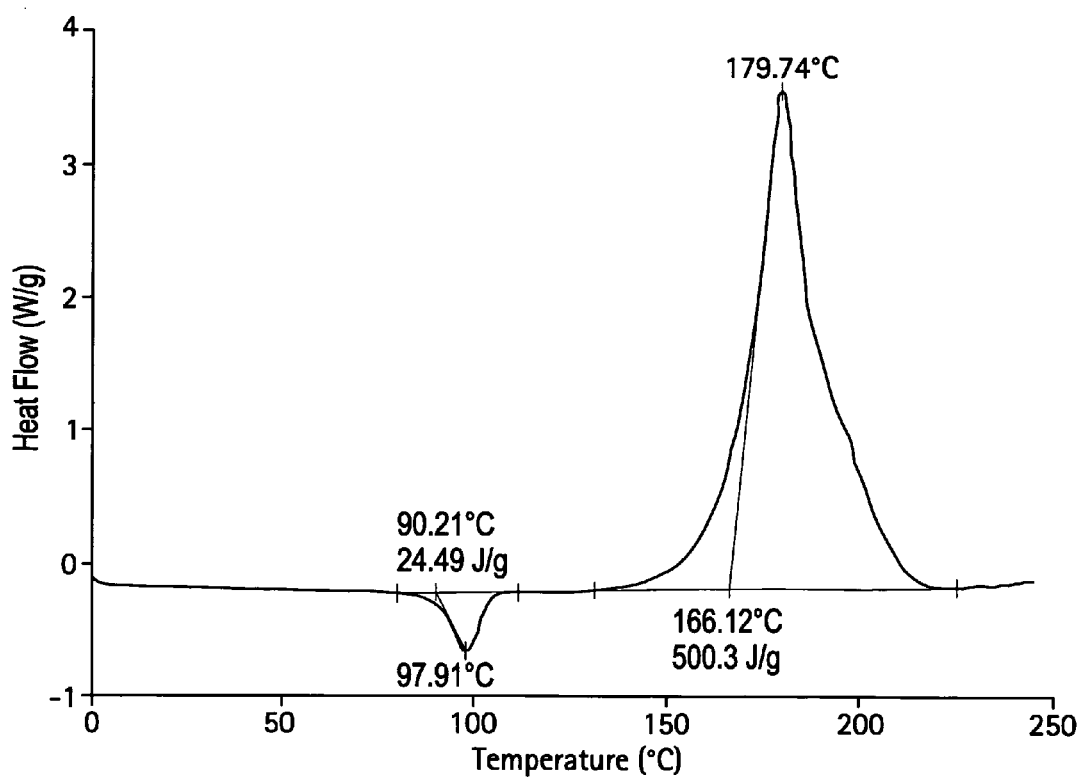
FIG. 17 is a graph depicting the differential scanning calorimetry analysis obtained for molecular melt sample J. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Toluene (20.00 g) is charged to the reactor followed by 4,4'-Oxydibenezenesulfonyl Azide (DPO-BSA) (3.00 g) and (calciumdiethyl bis(((3,5-bis(1,1-dimethylethyl)-4-hydroxyphenyl)methyl) phosphonate) (5.48 g) (an antioxidant available from the Ciba Specialty Chemicals Company under the trade name IRGANOX® I-1425), stirring commenced and the temperature is raised to 80° C. resulting in a clear solution. Toluene is taken overhead under vacuum, from the mixture till a clear melt results at 85° C. When the batch is dry, the compounded polymer additive formulation is kept at 85° C. and poured into a 100 ml bottle, cooled to 25° C. The product was then dried in a vacuum oven at 40° C./1.0 mm Hg. The product is a free flowing powder which is not shock sensitive and can be handled with no special precautions. Analysis by HPLC shows the composition of this molecular melt to be 35.37 wt. % DPO-BSA and 64.63 wt. % IRGANOX® I-1425. Differential scanning calorimetry analysis determined that the DPO-BSA: I-1425 molecular melt formed by this procedure exhibited a total crystallinity of 68.76% weighted average weight percent. FIG. 17 shows the differential scanning calorimetry results for Molecular Melt Sample J.

Figure 18:
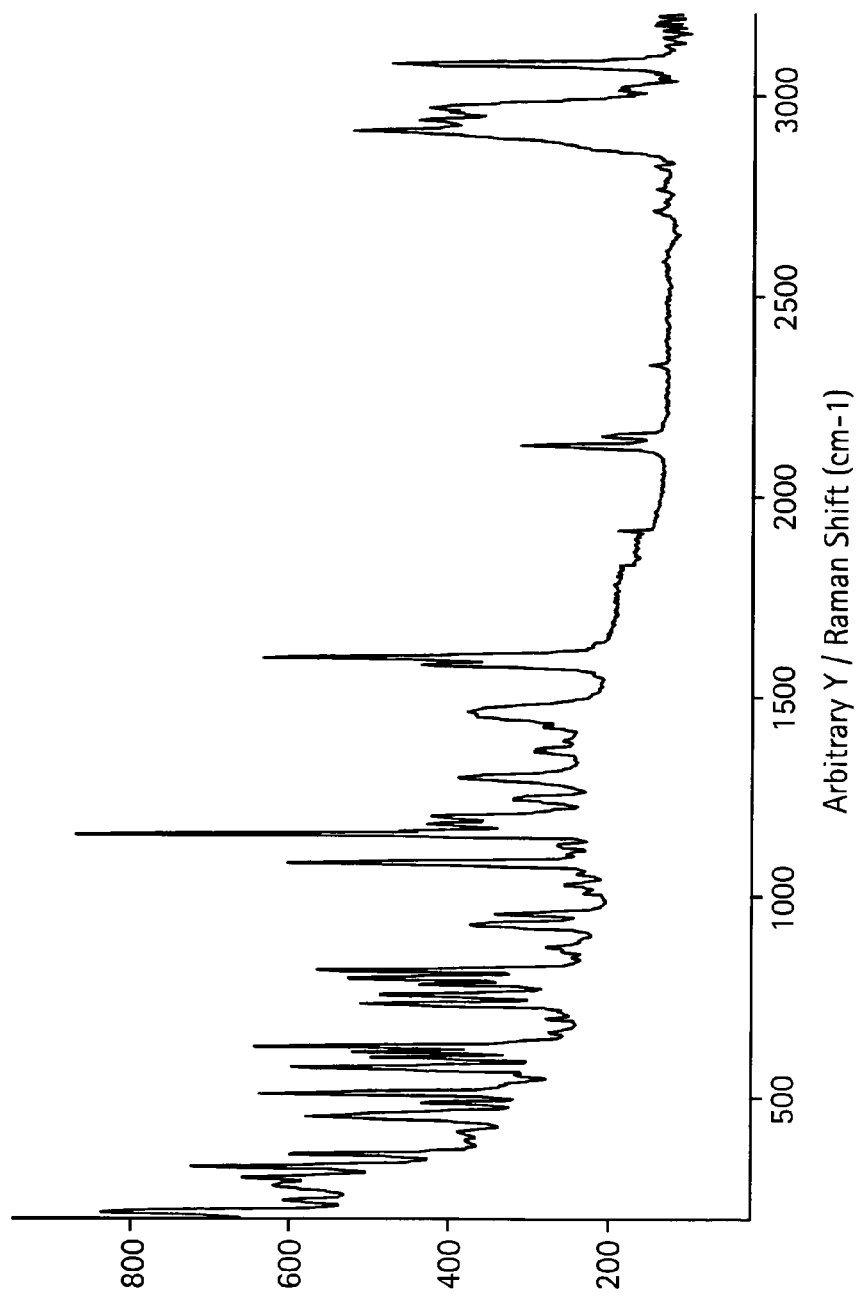
FIG. 18 is a depiction of the Raman Spectra obtained from a molecular melt containing DPO-BSA and Irganox I-1425.

As can be seen from the Raman spectra of FIG. 18, the molecular melt composition of Sample J exhibits a doublet at approximately 2100 cm$^{-1}$. The left peak of the doublet is due to the DPO-BSA, the right peak of the doublet is due to the interaction of the DPO-BSA with the Irganox I-1425.

Example 12

4,4'-OXYDIBENZENESULFONYL AZIDE (DPO-BSA) Melt Blend Compounding Process to Manufacture DPO-BSA:I-1010 in a 1:3.3 Weight Ratio (1:1.066 Molar Ratio) Molecular Melt (Molecular Melt Sample K)

Following is a method that can be utilized to produce a molecular melt having a higher percentage of crystallinity than the molecular melt obtained in the previous examples. The example also demonstrates that the DPO-BSA is never isolated in purified form, the I-1010 is added to the DPO-BSA while it is suspended in the toluene, to phlagmatize the DPO-BSA so that it may easily and safely be recovered from the toluene.

DPO-BSA is manufactured in a batch process using a glass lined stirred reactor which is equipped with a jacket for cooling/heating, bottom drain valve, condenser, thermowell, and a nitrogen pad. Toluene from recycle (186.83 kg )and fresh toluene (66.9 kg) is charged to the reactor. This is heated to 50° C. and 96.1 kg of 4,4'-oxydibenzenesulfonyl chloride (DPO—BSC) is added while stirring. To the reactor 87.78 kg of recycle water from the water wash of the previous reaction is than added and the stirrer set at 150 rpm. 0.24 kg of NaHCO3 is then added to neutralize any acid in the solution. When a pH paper confirms that the water phase is neutral then 0.24 kg of tetra-n-butyl-ammonium chloride (PTC) is added. To this is added 35 kg of sodium azide over fifteen minutes. The stirrer rpm is increased to 300 to insure proper mixing of the phases. The reactor temperature is increased from 50° C. to 65° C. over 30 minutes. The reaction is 100% converted in 75 minutes as confirmed by Liquid Chromatography analysis. The stirrer is turned off and the phases allowed to separate for 10 minutes. The bottom water/salt phase is removed using the bottom drain valve and sent to the on site incinerator. An additional 29.33 kg of 55° C. water is added and the stirrer set at 250 rpm for 5 minutes then turned off and the phases allowed to separate (10 minutes). The bottom phase is again removed and the water extraction step is repeated two more times (2×29.33 kg of 55° C. water). The stirrer rpm is reduced to 200 for the subsequent extractions to insure that a permanent emulsion does not occur. All three washes are combined and held for recycle to the next batch.

Figure 19:
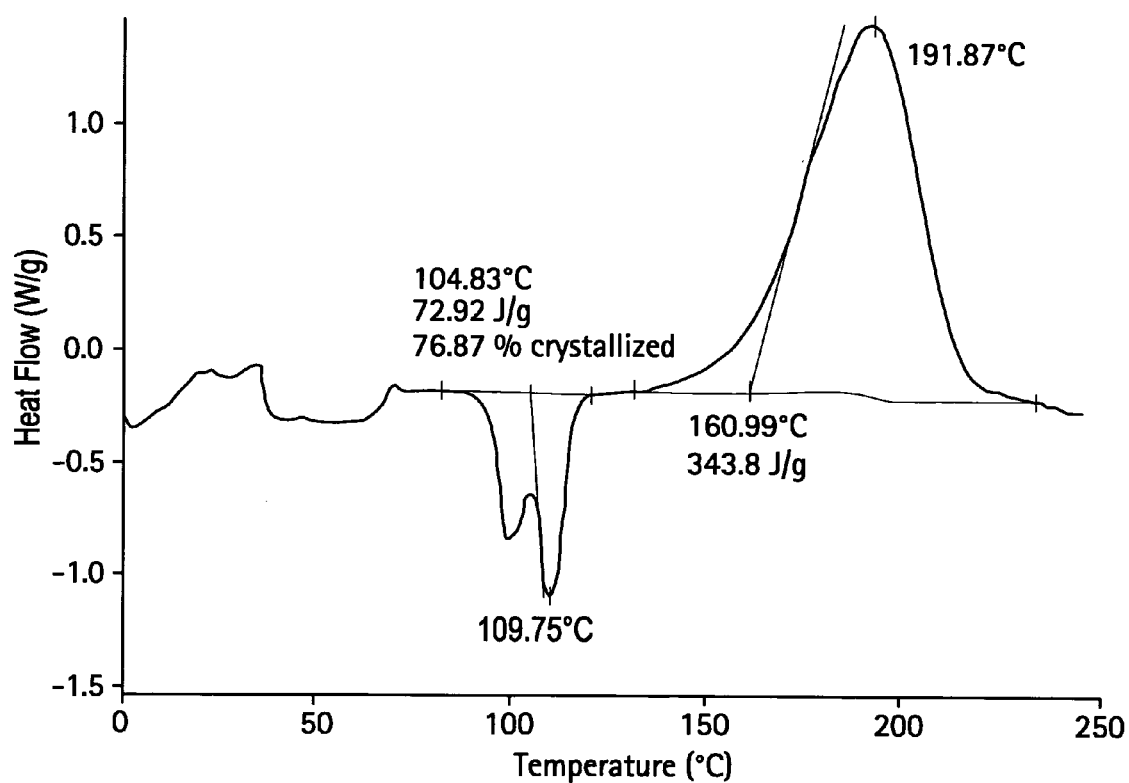
FIG. 19 is a graph depicting the differential scanning calorimetry analysis obtained for molecular melt sample K. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

IRGANOX® I-1010 (334.6 kg) is added into mixture and stirred till a clear solution results at 94° C. The reactor temperature is raised to 97° C. while toluene (186.83 kg ) is collected from the overhead (2 hours) and is recovered for recycle to the DPO-BSA manufacturing process. Methanol (600 kg) is added and the remaining toluene removed via azeotropic distillation with the methanol. When the batch is free of toluene, the formulation is cooled to 5° C. and crystals are allowed to form which are then collected by centrifugation. The product is then dried in a rotary drier at 40° C./10 mm Hg. The product is a free flowing powder that is not shock sensitive and can be handled with no special precautions. Analysis by HPLC shows the composition of this molecular melt to be 23.26 wt. % DPO-BSA and 76.74 wt. % IRGANOX® I-1010. Differential scanning calorimetry analysis determined that the DPO-BSA:Irganox-1010 molecular melt formed by this procedure exhibited a total crystallinity of 76.87% weighted average weight percent. FIG. 19 shows the differential scanning calorimetry results for this Molecular Melt.

Example 13

Production of Rheology Modified Polymers Using a DPO-BSA:I-1010 in a 1:3.3 Weight Ratio (1:1.066 Molar Ratio) Molecular Melt Base Polypropylene Resin The base polypropylene used to make the samples used in all the following examples is isotactic polypropylene pellets, available from The Dow Chemical Company under the designation Dow H700-12 PP and Dow C105-02 PP. Dow H700-12 PP is a homopolymer of propylene, melt flow rate (MFR)=12 dg/min at 230° C./2.16 kg. Dow C105-02 PP is an impact copolymer of propylene with 16-22 weight percent of ethylene, melt flow rate (MFR)=1.7 dg/min at 230° C./2.16 kg.

Preparation of Modified Polypropylenes

Polymer Samples A1, B1, and CA are produced as follows. 1500 grams of polymer were weighed into a container.

TABLE 2

| Polymer Sample | Base Polymer | Method of Addition | MFR | 1:3.3 wt ratio DPO-BSA: Irganox 1010 Molecular Melt (ppm) | Bisazide from Molecular Melt** (ppm) | Irganox 1010 from Molecular Melt** (ppm) | Irganox 1010 (ppm) | Irgafos 168 (ppm) | Irganox B225 (ppm) | Silicone oil (ppm) | Profax 6301 | Profax 6501 |
|---|---|---|---|---|---|---|---|---|---|---|---|---|
| A1 | H700-12 | Tumbled | 3.6 | 2150 | 500 | 1650 | 0 | 250 | 0 | 1000 | 0 | 0 |
| A2 | H700-12 | Powder Masterbatch | 3.6 | 2150 | 500 | 1650 | 0 | 250 | 0 | 0 | 5 wt % | 0 |
| CA | H700-12 | Tumbled | 12.1 | 0 | 0 | | 0 | 0 | 500 | 1000 | 0 | 0 |
| B1 | C105-02 | Tumbled | 1.3 | 860 | 200 | 660 | 340 | 1000 | 0 | 1000 | 0 | 0 |
| B2 | C105-02 | Powder Masterbatch | 1.7 | 860 | 200 | 660 | 340 | 1000 | 0 | 0 | 0 | 5 wt % |
| CB | C105-02 | Powder Masterbatch | 2.0 | 0 | 0 | 0 | 1000 | 1000 | 0 | 0 | 0 | 5 wt % |

1.5 grams of oil was added and the container was then tumbled for 30 minutes. At that time, the desired amounts of Molecular Melt (1:3.3 wt ratio DPO-BSA:Irganox 1010) and additives (see Table 2) were added and the container was tumbled for an additional 30 minutes. The tumbled mixture was fed directly to a 20 mm extruder using a single vibratory feeder. The feed rate was adjusted such that 80% torque was achieved.

Polymer Samples A2, B2 and CB are produced using a powder masterbatch method as follows. Two feeders were employed, one for delivery of a powder masterbatch to deliver the additives to the extruder and the second for delivery of the base polymer. The feeders were adjusted to feed in at weight ratio of 95 to 5 base polymer to powder masterbatch. The base polymer was placed in a vibratory feeder and fed directly to the extruder. The powder masterbatch was made by weighing 100 grams of an isotactic homopolymer polypropylene powder, (Profax 6301 for example A2 and Profax 6501 for examples B2 and CB, available from Bassel), into a container. The desired amounts Molecular Melt (1:3.3 wt. ratio DPO-BSA:Irganox 1010) and additives (see Table 2) were added, such that the final concentration in the product would be achieved, and the container was tumbled for 30 minutes. The base polymer and powder masterbatch feeder were adjusted to feed to the extruder at a weight ratio of 95 to 5 base polymer to powder masterbatch and to achieve 80% torque.

The extruder used in all cases was a 20 mm Welding Engineers twin-screw extruder. The extruder was run at 200 rpm. The temperature profile across the twin screw extruder from inlet to outlet 170, 180, 190, 200, 210, 220 and 230. The temperatures listed are barrel temperatures in the extruder. A die located at the outlet of the last zone had a temperature of 240° C. to ensure the full reaction of the BSA and propylene polymer. The resulting melt-extruded polymer went though the die and was then pelletized.

Referring to Table 2, the melt flow rates (MFR) of the resulting modified polymers (Polymer Samples A1, A2, B1, and B2), measured according to ASTM method D 1238 at 230° C. with a 2.16 kg weight, are reduced compared to the unmodified polymer samples. This indicates that the polymer samples were successfully rheology modified by the reaction of DPO-BSA with the base polypropylene polymer. It is believed that the Molecular Melt will more efficiently couple the base polymer than an equivalent amount of BSA alone.

Example 14

4,4'-OXYDIBENEZENESULFONYL AZIDE (DPO-BSA) Melt Blend Compounding Process to Manufacture DPO-BSA: I-1010: I-1076 in a 1:3.3: 1.4 Weight Ratio (1:1:1 Molar Ratio) Molecular Melt (Molecular Melt Sample L)

Figure 20:
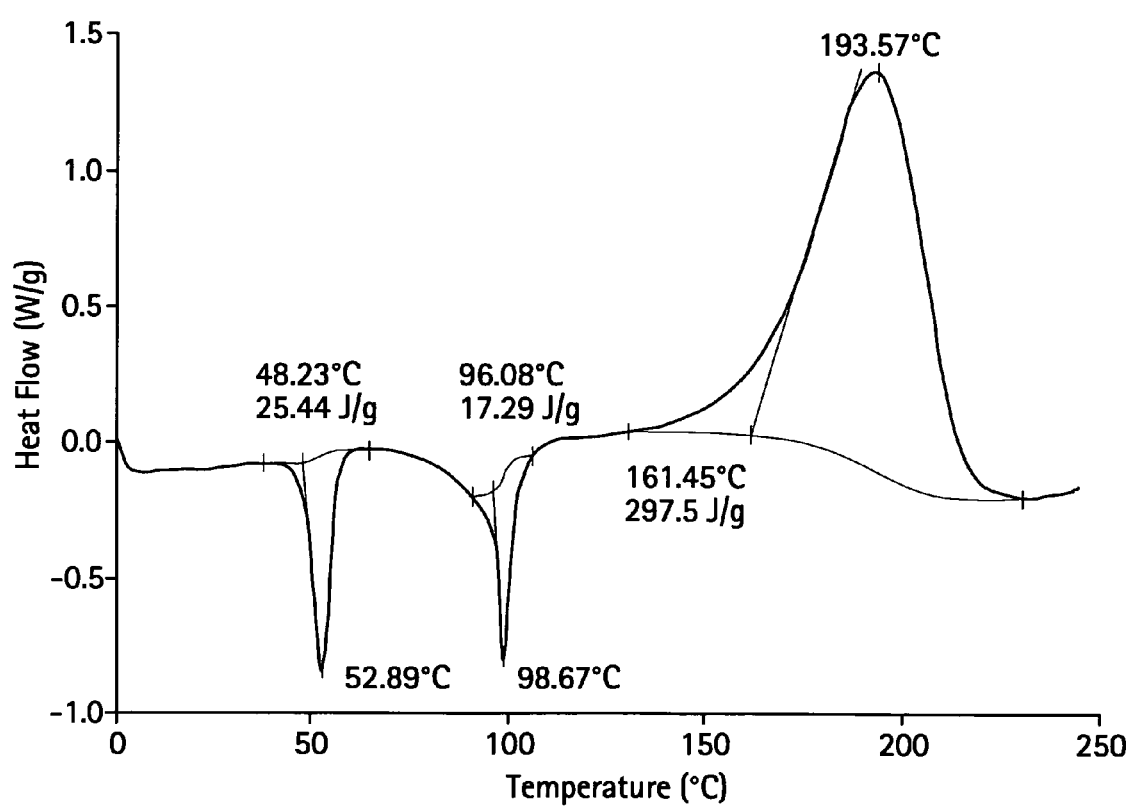
FIG. 20 is a graph depicting the differential scanning calorimetry analysis obtained for molecular melt sample L. The data was obtained in a single pass using a Thermo Analysis Instruments DSC V2.6D dual-cell differential scanning calorimeter. The endotherm shown was used to determine the crystallinity, the peak decomposition energy is also shown for the sample. The samples were contained in aluminum pans that were maintained under a nitrogen atmosphere. The temperature scan rate was 10° C./minute.

DPO-BSA, obtained as in example 1, is compounded in a batch process using a glass lined stirred reactor which is equipped with a jacket for cooling/heating, bottom drain valve, condenser, thermowell, and a nitrogen sparge. Methylene chloride (2500 g) is charged to the reactor followed by 4,4'-Oxydibenezenesulfonyl Azide (DPO-BSA) (250.00 g), IRGANOX® I-1010 (tetrakis-(Methylene (3,5-di-t-butyl-4-hydroxyhydrocinnamate))) (825.0 g), and IRGANOX® I-1076(octacecyl-3-(3,5-di-tert.butyl-4-hydroxyphenyl)-propionate) (349.02 g), stirring commenced and the temperature is raised to 81° C. resulting in a clear solution. Methylene chloride is taken overhead under vacuum from the mixture till a clear melt results at 93° C. When the batch is dry, the compounded polymer additive formulation is kept at 96° C. and poured into a stainless steel pan (32×18×4 inches), and allowed to cool to 25° C., then ground in a Franklin Miller grinder to obtain particles in the range of 200 to 2000 microns. The product was then dried in a vacuum oven at 40° C./1.0 mm Hg. The product is a free flowing powder which is not shock sensitive and can be handled with no special precautions. Analysis by HPLC shows the composition of this molecular melt to be 17.56 wt. % DPO-BSA, 57.93 wt. % IRGANOX® I-1010 and 24.51 wt. % IRGANOX® I-1076. Differential scanning calorimetry analysis determined that the DPO-BSA:I-1010:I-1076 molecular melt formed by this procedure exhibited a total crystallinity of 24.7% weighted average weight percent. FIG. 20 shows the differential scanning calorimetry results for Molecular Melt Sample L. One of ordinary skill in the art can determine from FIG. 20 that the bulk of the I-1076 is crystalline, whereas the DPO-BSA and I-1010 are amorphous in this molecular melt.

It is believed that a molecular melt comprised of DPO-BSA, I-1010 and I-1076 when reacted with a target polymer produces a more uniform coupled product, having lower gel count when made into a cast film. Additionally, this molecular melt advantageously exhibits the highly amorphous nature of a typical high amorphous DPO-BSA:I-1010 molecular melt, but also exhibits increased resistance to agglomeration, thereby reducing any blocking of the molecular melt as compared with a typical high amorphous DPO-BSA:I-1010 molecular melt.

We claim:

1. A molecular melt composition comprising:
   a) an antioxidant; and
   b) a modifying agent.
2. The composition of claim 1, wherein a reactive group of the modifying agent is selected from the group consisting of a nitrene and a carbene.
3. The composition of claim 1, wherein the modifying agent is selected from the group consisting of sulfonyl azides, phosphazene azides, silyl azides, formyl azides, azides, salts of N-cholorosulfonamides, N, N dichiorosulfonamides, the inner salts of 2-trialkyl-1-sulfonylhydrazides, diazo alkanes, geminally-substituted methylene groups, ketenes, metallocarbenes, and mixtures thereof.
4. The composition of claim 1, wherein the modifying agent comprises a sulfonyl azide.
5. The composition of claim 1, wherein the antioxidant is selected from the group consisting of phenolic compounds and derivatives thereof, hindered amines and derivatives thereof, amine hydroxides and derivatives thereof, thioester compounds and derivatives thereof, hindered phenolic compounds and derivatives thereof, lactones and derivatives thereof, and mixtures thereof.
6. The composition of claim 1, wherein the antioxidant comprises a phenolic compound.
7. The composition of claim 1, wherein the antioxidant comprises a hindered phenolic compound.
8. The composition of claim 1, wherein the antioxidant is tetrakis [Methylene (3,5-di-t-butyl-4-hydroxyhydrocinnamate)] or derivatives thereof.
9. The composition of claim 1, wherein the modifying agent contains functional heteroatoms in addition to those present on the groups forming the carbene or nitrene group.
10. The composition of claim 1, wherein the modifying agent contain a functional group in additional to the group forming the carbene or nitrene group.
11. The composition of claim 10, wherein the functional group is selected from the group consisting of: amides, imides, epoxy, esters, carboxylic acids, hydroxy groups, anhydrides, amino groups, and mixtures thereof.
12. A method for making a molecular melt, comprising the steps of: introducing an antioxidant into a liquid containing a coupling agent; and recovering the molecular melt.
13. The method of claim 12, wherein the coupling agent is suspended in the liquid.
14. The method of claim 12, wherein the coupling agent is dissolved in the liquid.
15. The method of claim 12, wherein the liquid is part of a reaction mixture within which the coupling agent is produced.
16. The method of claim 15, wherein the antioxidant is introduced into the reaction mixture prior to the coupling agent being produced.
17. The method of claim 15, wherein the antioxidant is introduced into the liquid after the coupling agent is formed.
18. The method of claim 12, wherein the coupling agent is a poly (sulfonyl azide).
19. The method of claim 12, wherein the antioxidant is selected from the group consisting of phenolic compounds and derivatives thereof, hindered amines and derivatives thereof, amine hydroxides and derivatives thereof, thioester compounds and derivatives thereof, hindered phenolic compounds and derivatives thereof, lactones and derivatives thereof, and mixtures thereof.
20. The method of claim 19, wherein the antioxidant is tetrakis [Methylene (3,5-di-t-butyl-4-hydroxyhydrocinnamate)] or derivatives thereof and wherein the antioxidant is introduced into the liquid after the coupling agent is formed.
21. The method of claim 12, wherein the molecular melt is recovered from the liquid by precipitating the molecular melt from the liquid.
22. The method of claim 12, wherein the molecular melt is recovered from the liquid by co-crystallizing the antioxidant and the coupling agent.

* * * * *